US009264868B2

(12) United States Patent
Giaretta et al.

(10) Patent No.: US 9,264,868 B2
(45) Date of Patent: Feb. 16, 2016

(54) MANAGEMENT OF NETWORK ACCESS REQUESTS

(75) Inventors: Gerardo Giaretta, San Diego, CA (US); Jay Kumar Sundararajan, San Diego, CA (US); Satashu Goel, San Diego, CA (US); Arnaud Meylan, San Diego, CA (US); Debesh Kumar Sahu, Hyderabad (IN); Sachin Jain, Hyderabad (IN); Ajith Tom Payyappilly, San Diego, CA (US); Tejash Rajnikant Shah, San Diego, CA (US); Lorenzo Casaccia, Rome (IT); Dino Flore, Rome (IT)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/288,933

(22) Filed: Nov. 3, 2011

(65) Prior Publication Data

US 2012/0185577 A1 Jul. 19, 2012

Related U.S. Application Data

(60) Provisional application No. 61/434,253, filed on Jan. 19, 2011, provisional application No. 61/454,457, filed on Mar. 18, 2011, provisional application No. 61/503,395, filed on Jun. 30, 2011.

(51) Int. Cl.
*G06F 15/173* (2006.01)
*H04W 4/16* (2009.01)
(Continued)

(52) U.S. Cl.
CPC .............. *H04W 4/16* (2013.01); *H04L 67/289* (2013.01); *H04L 67/2819* (2013.01);
(Continued)

(58) Field of Classification Search
CPC ....... H04W 4/16; H04W 52/00; H04W 4/003; H04W 52/0264; H04W 4/02; H04W 4/22; H04L 67/289; H04L 67/2819; G06F 2209/542
USPC .......... 709/223–229; 370/311, 329, 335, 336, 370/468; 455/434
See application file for complete search history.

(56) References Cited

U.S. PATENT DOCUMENTS 5,737,687 A 4/1998 Martin et al.
6,115,744 A * 9/2000 Robins et al. ................. 709/227
(Continued)

FOREIGN PATENT DOCUMENTS

CN 102186167 A 9/2011
EP 2019517 A1 1/2009
(Continued)

OTHER PUBLICATIONS dictionary.com, delay, retrieved Jan. 14, 2015.*
(Continued)

*Primary Examiner* — Brian J Gillis
*Assistant Examiner* — Michael A Keller

(57) ABSTRACT

Methods, systems, and devices are described for intercepting requests from applications installed on a mobile device. The requests are system calls that establish communication channels for the mobile device. The requests are captured and held from reaching TCP/IP stack of an operating system executing on the mobile device. An intercepted request is aggregated with other intercepted requests. The aggregated requests are bundled together and released to the operating system upon the detection of a triggering event. The capture, holding, and aggregation of requests from applications occur when the mobile device is in a background mode.

33 Claims, 14 Drawing Sheets

(51) Int. Cl.
| | |
|---|---|
| *H04W 4/00* | (2009.01) |
| *H04W 52/02* | (2009.01) |
| *H04L 29/08* | (2006.01) |
| *H04W 4/02* | (2009.01) |
| *H04W 4/22* | (2009.01) |

(52) U.S. Cl.
CPC ......... *H04W 4/003* (2013.01); *H04W 52/0264* (2013.01); *G06F 2209/542* (2013.01); *H04W 4/02* (2013.01); *H04W 4/22* (2013.01)

(56) References Cited

U.S. PATENT DOCUMENTS

| | | | |
|---|---|---|---|
| 6,122,514 A | 9/2000 | Spaur et al. | |
| 6,181,919 B1 | 1/2001 | Ozluturk | |
| 6,198,911 B1 | 3/2001 | Lea et al. | |
| 7,107,063 B1 | 9/2006 | Bates et al. | |
| 7,251,490 B2 | 7/2007 | Rimoni | |
| 7,486,954 B2 | 2/2009 | Lee et al. | |
| 7,552,441 B2 | 6/2009 | Lim et al. | |
| 7,610,057 B2 | 10/2009 | Bahl et al. | |
| 7,664,838 B2* | 2/2010 | Monga et al. | 709/223 |
| 7,756,068 B2 | 7/2010 | Tao et al. | |
| 7,769,887 B1 | 8/2010 | Bhattacharyya et al. | |
| 7,860,469 B2 | 12/2010 | Mohanty et al. | |
| 7,873,746 B2 | 1/2011 | Li | |
| 7,940,735 B2 | 5/2011 | Kozisek et al. | |
| 7,990,897 B2 | 8/2011 | Jing et al. | |
| 8,312,531 B2 | 11/2012 | Walter et al. | |
| 2002/0001292 A1 | 1/2002 | Miyamoto | |
| 2002/0052790 A1 | 5/2002 | Tomishima | |
| 2002/0095524 A1 | 7/2002 | Sanghvi et al. | |
| 2002/0123356 A1 | 9/2002 | Michaud et al. | |
| 2003/0134632 A1 | 7/2003 | Loughran | |
| 2003/0153317 A1 | 8/2003 | Friman et al. | |
| 2004/0009751 A1* | 1/2004 | Michaelis et al. | 455/62 |
| 2004/0097254 A1* | 5/2004 | Laroia et al. | 455/522 |
| 2004/0158729 A1 | 8/2004 | Szor | |
| 2004/0172481 A1 | 9/2004 | Engstrom | |
| 2004/0192391 A1 | 9/2004 | Nagai | |
| 2004/0264396 A1* | 12/2004 | Ginzburg et al. | 370/311 |
| 2005/0060583 A1 | 3/2005 | Lin | |
| 2005/0149376 A1 | 7/2005 | Guyan et al. | |
| 2005/0182958 A1 | 8/2005 | Pham et al. | |
| 2006/0155856 A1* | 7/2006 | Nakashima et al. | 709/227 |
| 2006/0217116 A1 | 9/2006 | Cassett et al. | |
| 2006/0221953 A1* | 10/2006 | Basso et al. | 370/389 |
| 2006/0274750 A1 | 12/2006 | Babbar et al. | |
| 2007/0174469 A1* | 7/2007 | Andress et al. | 709/227 |
| 2007/0178876 A1 | 8/2007 | Yaqub et al. | |
| 2007/0201369 A1 | 8/2007 | Pedersen et al. | |
| 2007/0245171 A1 | 10/2007 | Ohly et al. | |
| 2007/0286222 A1* | 12/2007 | Balasubramanian | 370/412 |
| 2007/0294410 A1* | 12/2007 | Pandya et al. | 709/226 |
| 2008/0019339 A1* | 1/2008 | Raju et al. | 370/338 |
| 2008/0102815 A1 | 5/2008 | Sengupta et al. | |
| 2008/0183857 A1* | 7/2008 | Barfield et al. | 709/224 |
| 2008/0234012 A1 | 9/2008 | Liu et al. | |
| 2009/0005127 A1 | 1/2009 | Frenger et al. | |
| 2009/0022095 A1* | 1/2009 | Spaur et al. | 370/329 |
| 2009/0049518 A1 | 2/2009 | Roman et al. | |
| 2009/0183186 A1 | 7/2009 | Murtagh | |
| 2009/0296641 A1 | 12/2009 | Bienas et al. | |
| 2009/0318124 A1 | 12/2009 | Haughn | |
| 2009/0325512 A1 | 12/2009 | Granlund et al. | |
| 2010/0045422 A1 | 2/2010 | Teng et al. | |
| 2010/0142477 A1 | 6/2010 | Yokota | |
| 2010/0144332 A1 | 6/2010 | Savoor | |
| 2010/0231383 A1 | 9/2010 | Levine et al. | |
| 2010/0279745 A1 | 11/2010 | Westcott et al. | |
| 2010/0285776 A1* | 11/2010 | de Froment | 455/411 |
| 2010/0287281 A1* | 11/2010 | Tirpak | 709/226 |
| 2010/0322124 A1 | 12/2010 | Luoma et al. | |
| 2011/0003592 A1 | 1/2011 | Matsumoto | |
| 2011/0019557 A1 | 1/2011 | Hassan et al. | |
| 2011/0028085 A1 | 2/2011 | Waung et al. | |
| 2011/0029658 A1 | 2/2011 | Werth et al. | |
| 2011/0054879 A1* | 3/2011 | Bogsanyl et al. | 703/23 |
| 2011/0149797 A1 | 6/2011 | Taaghol et al. | |
| 2011/0182220 A1 | 7/2011 | Black et al. | |
| 2011/0185202 A1 | 7/2011 | Black et al. | |
| 2011/0188394 A1* | 8/2011 | Seo | 370/252 |
| 2011/0201285 A1 | 8/2011 | Giaretta et al. | |
| 2012/0020266 A1* | 1/2012 | Sun et al. | 370/311 |
| 2012/0129503 A1 | 5/2012 | Lindeman et al. | |
| 2012/0134361 A1 | 5/2012 | Wong et al. | |
| 2012/0214527 A1 | 8/2012 | Meylan et al. | |
| 2012/0236772 A1 | 9/2012 | Kondratiev | |
| 2012/0257512 A1 | 10/2012 | Lim | |
| 2012/0270538 A1 | 10/2012 | Meylan et al. | |
| 2013/0052965 A1 | 2/2013 | Meylan et al. | |
| 2013/0053013 A1 | 2/2013 | Giaretta et al. | |
| 2013/0165181 A1 | 6/2013 | Hasegawa | |
| 2013/0217331 A1 | 8/2013 | Manente | |
| 2013/0217357 A1 | 8/2013 | Menezes et al. | |
| 2013/0225100 A1 | 8/2013 | Chen et al. | |
| 2014/0286256 A1 | 9/2014 | Chowdhury et al. | |

FOREIGN PATENT DOCUMENTS

| | | |
|---|---|---|
| JP | H10178453 A | 6/1998 |
| JP | 2001339465 A | 12/2001 |
| JP | 2002091841 A | 3/2002 |
| JP | 2004509539 A | 3/2004 |
| JP | 2004297218 A | 10/2004 |
| JP | 2008048072 A | 2/2008 |
| JP | 2008072568 A | 3/2008 |
| JP | 2008187377 A | 8/2008 |
| JP | 2009021966 A | 1/2009 |
| JP | 2009038653 A | 2/2009 |
| JP | 2009182443 A | 8/2009 |
| JP | 2009540687 A | 11/2009 |
| JP | 2010074818 A | 4/2010 |
| JP | 2010183414 A | 8/2010 |
| JP | 2011530860 A | 12/2011 |
| JP | 2012529807 A | 11/2012 |
| WO | 0223362 A1 | 3/2002 |
| WO | 03036491 A1 | 5/2003 |
| WO | 2007146549 A2 | 12/2007 |
| WO | 2008011420 A1 | 1/2008 |
| WO | 2009096410 A1 | 8/2009 |
| WO | 2010016849 A1 | 2/2010 |
| WO | 2011023096 A1 | 3/2011 |
| WO | 2011146831 A1 | 11/2011 |

OTHER PUBLICATIONS

Kravets R et al: "Application-Driven Power Management for Mobile Communication" Wireless Networks, ACM, New York, NY, US, vol. 6, No. 4, Sep. 2000, pp. 263-277, XP001036334 ISSN: 1022-0038.
Ananthanarayaran G., et al., "A New Communications API", Electrical Engineering and Computer SciencesUniversity of California at Berkeley, May 25, 2009, pp. 1-14, XP002676108, Retrieved from the Internet: URL:http://www.eecs.berkeley.edu/Pubs/Tech Rpts/2009/EECS-2009-84.pdf [retrieved on May 16, 2012].
Andrea Passarella: "Power Management Policies for Mobile Computing", Feb. 1, 2005, pp. 1-151, XP055019616, Retrieved from the Internet: URL:http://cnd.iit.cnr.it/andrea/docs/passarella_phd_thesis.pdf [retrieved—on Feb. 16, 2012] * chapter 5.3, 5.3.1.
Chen L., et al., "QoS aware power efficiency in IEEE 802.11 LAN", Consumer Communications and Networking Conference, 2005. CCNC. 2005 Second IEEE, IEEE, Piscataway, NJ, USA, Jan. 3, 2005, pp. 85-90, XP010787616, DOI: 10.1109/CCNC.2005.1405149, ISBN: 978-0-7803-8784-3 * chapter III C * figures 3-2.
Hare, et al., "A Network-Assisted System for Energy Efficiency in Mobile Devices," 2011 Third International Conference on Communication Systems and Networks, COMSNETS, pp. 1-10, Jan. 2011.
International Search Report and Written Opinion—PCT/US2011/059439—ISA/EPO—Feb. 24, 2012.
Liu China MOB1 Le Yuri Ismai Lov Ericsson Z Cao China Mobile D: "Socket API Extension for MIF Host; draft-liu-mif-api-extension-

(56) References Cited

OTHER PUBLICATIONS 03.txt", Socket API Extension for MIF Host; draft-liu-mi f-api-extension-03.txt, Internet Engineering Task Force, IETF; Standardworkingdraft, Internet Society (ISOC) 4, Rue Des Falaises CH—1205 Geneva, Switzerland, No. 3, Oct. 25, 2010, pp. 1-8, XP015072273, [retrieved on Oct. 25, 2010] abstract* chapters 3-7 * figure 1.

Liu China Mobile Yuri Ismailov Ericsson Z Cao China Mobile D: "Socket API Extension for MIF Host; draft-liu-mif-api-extension-04.txt", Socket API Extension for MIF Host; draft-liu-mif-api-extension-04.txt, Internet Engineering Task Force, IETF; Standardworki Ngdraft, Internet Society (ISOC) 4, Rue Des Falaises CH—1205 Geneva, Switzerland, No. 4, Mar. 15, 2011, pp. 1-9, XP015074974, [retrieved on Mar. 15, 2011] abstract *chapter 3-5 * figure 1.

Liu H., et al: "TailTheft: Leveraging the Wasted Time for Saving Energy in Cellular Communications", MobiArch '11 Proceedings of the sixth international workshop on MobiArch Jun. 28, 2011, pp. 31-36, XP002676107, ISBN: 978-1-4503-0740-6 Retrieved from the Internet: URL:http://delivery.acm.org/10.1145/2000000/1999925/p31-liu.pdf?ip=145.64.134.245&acc=ACTIVE%20SERVICE&CFID=103451177&CFTOKEN=63558822&__acm__=1337160633_c5b6dc53c6b1c9 77ac53b9dfb0180831 [retrieved on May 16, 2012].

Larsson H Levkowetz H Mahkonen T Kauppinen Ericsson C: "A Filter Rule Mechanism for Multi-access Mobile IPv6; draft-larsson-monami 6-filter-rules-02.txt" IETF Standard-Working-Draft, Internet Engineering Task Force, IETF, CH, No. 2, Mar. 5, 2007, XP015050112, ISSN: 0000-0004.

Pering T., et al., "Coolspots: Reducing the Power Consumption of Wireless Mobile Devices With Multiple Radio Interfaces," the 4th. International Conference on Mobile Systems, Applications and Services, Jun. 19-22, 2006, pp. 220-232.

* cited by examiner

MANAGEMENT OF NETWORK ACCESS REQUESTS

CROSS-REFERENCES TO RELATED APPLICATIONS

This application claims the benefit under 35 U.S.C. §119 (e) to U.S. Provisional Patent Application No. 61/434,253 entitled "SYSTEMS AND METHODS FOR SYNCHRONIZING DATA CONNECTION REQUESTS," filed on Jan. 19, 2011, to U.S. Provisional Patent Application No. 61/454, 457, entitled "CONNECTIVITY MANAGEMENT FOR APPLICATIONS ON A USER DEVICE" by Giaretta et al., filed Mar. 18, 2011, to U.S. Provisional Patent Application No. 61/503,395 entitled "CONTROLLING APPLICATION ACCESS TO A NETWORK," filed on Jun. 30, 2011 the disclosures of which are expressly incorporated by reference herein in their entireties.

BACKGROUND

Applications or device applets are now available that operate to provide a wide range of add-on services and features to wireless devices. For example, it is now possible for wireless devices to download and launch device applets to perform value added functions such as shopping, searching, position location, driving navigation, or an array of other functions. Network and application providers generally offer these device applets to device users for additional fees. Thus, the use of device applets may increase the functionality and usability of wireless devices and offers device users features and convenience not originally available on the devices themselves.

Typically, a wireless device interfaces with one or more communication networks using any of a number of radios. For example, the wireless device may include a variety of radios providing communications using Cellular, WiFi, Bluetooth, or other types of radio access technologies. Accordingly, applications executing on the wireless device interface with a radio to establish a communications channel and the channel is used by the applications to communicate with the appropriate network.

Applications may continue to interface with radios on the wireless device to establish communication channels even when the device is in a background mode. With an increasing number of applications installed on a device, the battery power of the device may be unnecessarily consumed from the repeated establishment of network communications while the device is not active. Further, the increasing usage of wireless devices, such as smartphones, data networks may become overloaded by network signaling associated with the setup of communication channels.

SUMMARY

Methods, systems, and devices for managing the connectivity between a network and an application executing on a mobile device are described. In one example, a request for network access from the application executing on the device may be intercepted. For example, a wrapper may be placed between the application and the operating system of the mobile device to intercept the request. Upon intercepting the request, the request may be held from reaching a Transmission Control Protocol/Internet Protocol (TCP/IP) stack of the operating system. In one example, the request may be released to the operating system when a triggering event occurs. The capturing, holding, and releasing of requests may occur when the mobile device is in a background mode.

In one configuration, the request may be aggregated with other intercepted requests to perform a communication for the mobile device. The interception of the request from the application and the interception of the other requests may occur at different times.

In one example, instructions for a wrapper may be executed. The executed wrapper may perform the interception of the request from the first application. In one configuration, the wrapper may be located between an application layer and a socket layer of the operating system of the mobile device.

In one configuration, the first application may be identified as a class of application from which requests are held. An application may be identified as a critical application or a non-critical application. Only requests from non-critical applications may be held.

In one embodiment, the triggering event may include at least one of an expiry of a timer, a status change of a display, a status change of a microphone, a status change of a speaker, a status change of a global positioning system (GPS) sensor of the mobile device, an indication that a universal serial bus port is in use, an indication that an audio equipment is connected to the mobile device, an indication that a video equipment is connected to the mobile device, an indication that a connection to a Wi-Fi type of network is available, or an indication that a radio connection to a cellular type of network is open.

Further, in one example, a delay tolerance of the first application may be determined. In addition, a callback function may be provided to the first application based on the determined delay tolerance. The callback function may instruct the first application to connect to the communication resources.

In one configuration, an expiration time of a first timer associated with the first application may be determined. a tolerance and expiration time of a second timer associated with a second application may also be determined. The second timer may be forced to expire based on the expiration time of the first timer, the tolerance, and the expiration time of the second timer. The request from the first application and an intercepted request from the second application may be released to perform a communication for the mobile device.

In one example, a deadline may be received from the application. The request may be held until before the deadline. The request to connect to the communications resources may be released prior to the deadline. In one configuration, the request may include a system call to establish a communications channel for the mobile device. The request may be released to a socket layer of the operating system upon detecting the triggering event.

In one embodiment, an indication for an interval pertaining to how often the releasing of the request occurs may be received. The interval may be less than a timeout value in a stateful Internet Protocol (IP) middlebox in a network.

A mobile device configured for wireless communication is also described. The device may include a processor and memory in electronic communication with the processor. The memory may include an operating system. The processor may include a connectivity engine. The engine may be configured to execute instructions to intercept a request from a first application on the mobile device. The request may be a request to perform a communication for the mobile device. The engine may be further configured to hold the request from reaching TCP/IP stack of an operating system executing on the mobile device, and release the request to the operating system upon detecting a triggering event.

An apparatus configured to manage requests for network access from applications on a mobile device is also described. The apparatus includes means for intercepting a request from an application on the mobile device. The request may be a request to perform a communication for the mobile device. The apparatus may further include means for holding the request from reaching a TCP/IP stack of an operating system executing on the mobile device, and means for releasing the request to the operating system upon detecting a triggering event.

A computer program product configured to manage requests for network access from applications on a mobile device is also described. The product may include a non-transitory computer-readable medium. The medium may include code to intercept a request from an application on the mobile device. The request may be a request to perform a communication for the mobile device. The medium may further include code to hold the request from reaching a TCP/IP stack of an operating system executing on the mobile device, and code to release the request to the operating system upon detecting a triggering event.

The foregoing has outlined rather broadly the features and technical aspects of examples according to disclosure. Additional features will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, will be better understood from the following description when considered in connection with the accompanying figures. Each of the figures is provided for the purpose of illustration and description only and not as a definition of the limits of the claims.

BRIEF DESCRIPTION OF THE DRAWINGS

A further understanding of the nature of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
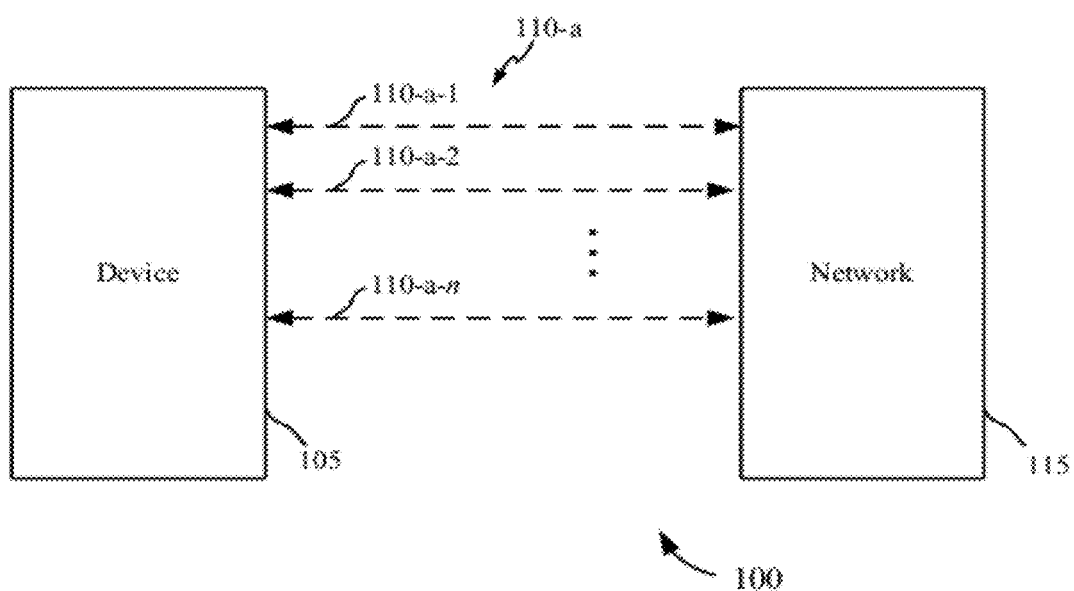
FIG. 1 shows a block diagram of a network environment.

Methods, systems, and devices are described to intercept requests from applications installed on a mobile device. The requests may be system calls that establish communication channels for the mobile device. The terms "requests" and "system calls" may be used interchangeably. The requests may be captured and held from reaching a TCP/IP stack of an operating system executing on the mobile device. An intercepted request may be aggregated with other intercepted requests. The aggregated requests may be bundled together and released to the operating system at approximately the same time upon detecting a triggering event on the mobile device. The capture, holding, and aggregation of requests from applications may occur when the mobile device is in a background mode.

In mobile devices such as smartphones, personal digital assistants, etc., software applications may continue to operate even though the user is not actively using the device. Applications such as social networking applications, email or other communication applications, data feeds, etc. (popular examples include Facebook®, Gmail®, Twitter®, etc.) may continue to send and receive data even though a user is not using the device. Even under an inactivity mode of operation, power consumption and spikes in activity may occur from applications that continue to operate even when the device is ostensibly not in use. The activity by these applications may utilize communication resources such as provided by an external network.

The applications may trigger frequent transitions by the mobile device from background mode to connected mode, or they may otherwise interfere with the device entering background mode or other alternate connection modes such as discontinuous reception (DRX). These elevated levels of radio activity by the applications when the user is not actively engaging the device may result in premature drain of battery life, undesired increased on the load of radio networks, or other undesired effects.

A mobile device may be in background mode when certain inputs of the device are not operational or are in a sleep state. In other words, the device may be in background mode when a user is not using the device. For example, when audio inputs (such as a microphone) are off, the device may be considered to be in a background mode. In addition, when visual inputs (such as a display of the device) are off, the device may be determined to be in a background mode. Additional inputs may be used to determine whether or not the mobile device is in a background mode, as will be described below.

Management of connectivity between a network and an application executing on a mobile device is described. When a number of applications installed on a mobile device request access to a network when the device is in a background mode, an unnecessary amount of network signaling may occur. For example, a first application may initiate a system call to establish a communication channel and then after the data have been transmitted/received, the channel may be discontinued. A second application may then initiate a system call to also establish a communication channel to transmit/receive data. Each time a communication channel is established, the amount of network signaling may increase so that the available bandwidth of the network may decrease. In addition, when a number of applications request access to a network while the device is in a background mode, an unnecessary amount of battery power may be consumed. Each time a communication channel is established, the battery power may decrease so that the available power is lower when the mobile device enters an active mode. As a result, the present systems and methods may hold and aggregate requests for network access to reduce network signaling and conserve batter power. As previously mentioned, this may occur when the device is not active. In addition, the holding and aggregation of system calls may occur when the battery power of the device falls below a certain threshold amount. When a triggering event occurs (e.g., the device enters an active mode), the aggregated requests may be released together to reduce the amount of network signaling as well as reduce the consumption of batter power associated with each separate request.

The holding and aggregation of requests may be performed when a mobile device is in an inactive mode so as to not interfere with the use of the device by a user. In one example, a request for network access from an application on a user device may be intercepted. For example, a wrapper may be placed between an application layer of the mobile device and an operating system layer of the device to intercept requests. In one example, the wrapper may be a software entity which intercepts requests. The wrapper may be transparent to the applications in the application layer as well as the operating system in the operating system layer. Upon intercepting the request, the request may be held or delayed from reaching the operating system. In one configuration, the request may be aggregated with other intercepted requests received from additional applications in the application layer. When a triggering event is detected, the aggregated requests may be released to the operating system. As a result, the wrapper may transparently intercept and aggregate requests and then relay the aggregated requests when additional processing is completed.

In addition, an interval may be determined that indicates how often held requests are to be released to the operating system of the device. The interval may determined so as to maintain a state of a middlebox, which is described below. In one example, Internet Protocol (IP) hosts may be separated by stateful middleboxes. A stateful middlebox may perform firewall and network address translation (NAT) functions. A function of a firewall may be to determine which inbound/outbound ports of the device are open or available. NAT functions may not be constantly deployed on cellular networks, but may be continuously deployed on LAN/WLAN. Applications executing on the mobile device may not differentiate between a cellular network and a Wi-Fi-network, as a result, the applications may use a timer to originate "keep-alive" requests to keep NAT functions operable on a cellular network. The state of the middleboxes may be maintained until the timer expires. If a long-lived connection (TCP or UDP) is needed, the middleboxes may keep their state throughout the connection. Applications executing on mobile devices (e.g., smartphones) may not be tailored for cellular networks (as opposed to Wi-Fi networks). As a result, these applications may select keep-alive/reconnect intervals that work anywhere, regardless if the interval causes a peak is signaling for cellular networks. Thus, the following describes systems and methods to conserve power and reduce signaling by reducing the number of system calls for network access by holding these requests for network access while the device is in a background mode and releasing the requests when a certain triggering event occurs or at intervals determined by a particular network.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring now to FIG. 1, a block diagram illustrates an example of a wireless network environment 100. The network environment 100 may include a mobile device 102 and a communication network 115. The device 102 may communicate with the network 115 using a number of radio channels 110-a. For example, a control channel 110-a-1 may be established between the device 105 and the network 115. In addition, other types of channels 110-a-2 through 110-a-n may also be established. These other types of channels may include data channels, voice channels, etc.

During operation, the device 102 may execute applications which may interface with the network 115 using any of a number of radios. For example, an executing application may issue a request to establish communications with the network 115. In one example, the requests may be a networking system call, such as a socket layer call. The request may be intended for the socket layer of an operating system on the device 105. Conventional devices typically allow these types of requests to proceed directly to the operating system to be processed. Upon receipt of the request, conventional devices begin network signaling processes to establish the control channel 110-a-1 through a data connection setup procedure. When data connection setup procedures are executed on the mobile device 105, battery power is consumed and the level of signaling across the network may increase. This may reduce the efficiency of the mobile device 105 and the network 115.

In one configuration, the device 105 may include an architecture to delay the release of a request to the operating system. This architecture may intercept a request for network access from an application. Upon intercepting the request, the architecture may hold or delay the request from reaching a TCP/IP stack of the operating system. The TCP/IP stack may include communication protocols that may be built into the operating system, providing the operating system with a standard for transmitting data over a network The intercepted request may be aggregated with other intercepted requests for network access received from additional applications. The aggregated requests may be bundled together and released as a single request for network access. In another example, the aggregated requests may be released upon the occurrence of a particular event (e.g., the mobile device becomes active). In one configuration, the architecture described above relating to the intercepting, holding, and aggregation may be used when the device 105 is in an inactive mode.

Figure 2:
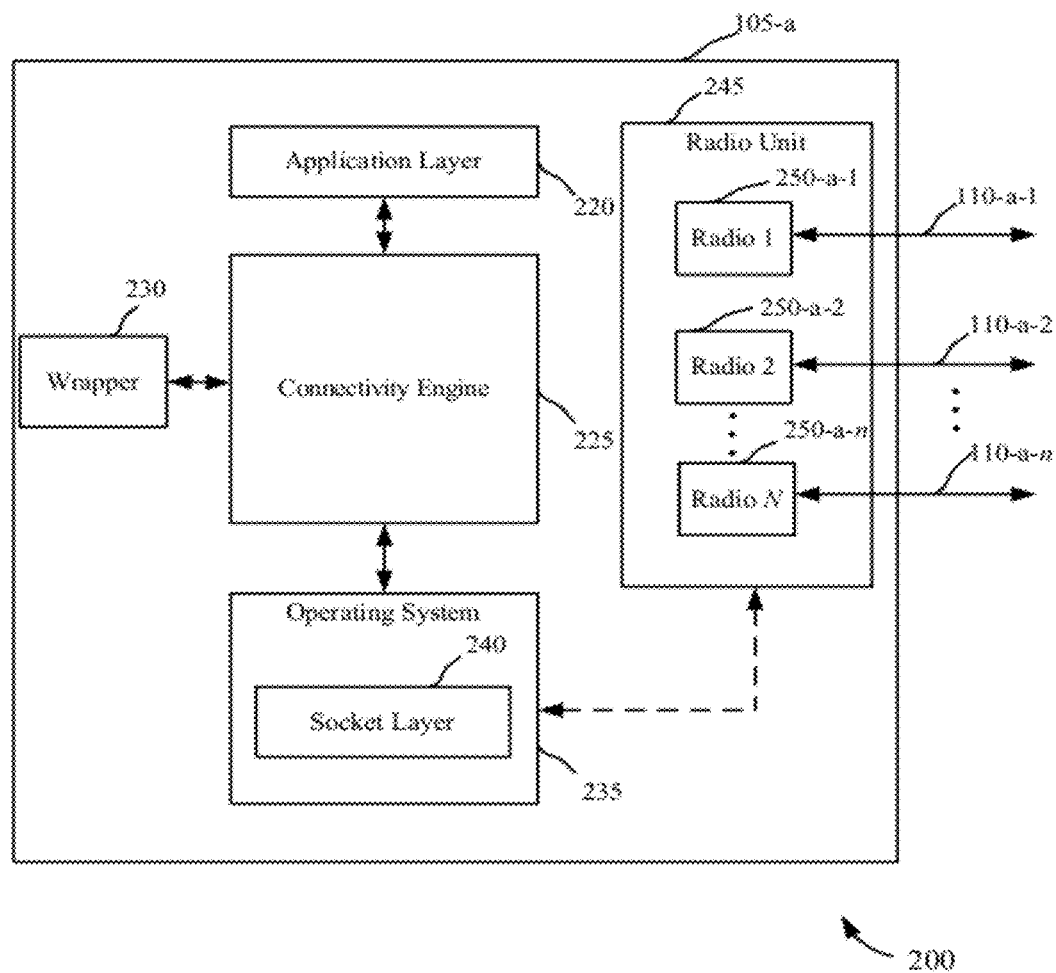
FIG. 2 shows a block diagram illustrating an architecture for a mobile device.

FIG. 2 shows one example of an architecture 200 of a mobile device 105-a, which may be an example of the mobile device 105 of FIG. 1. The architecture 200 of the device 105-a may include a connectivity engine 225. The connectivity engine 225 may manage when an application executing in an application layer 220 on the device 105-a may access a network, such as the network 115 of FIG. 1. The application layer 220 may include applications which may execute to provide various functions and communicate with outside networks, such as the network 115, using one or more of radios 250-*a* of a radio unit 245.

In one configuration, the connectivity engine 225 may execute a wrapper 230. In one example, the wrapper 230 may intercept a system call for network access originating from an application in the application layer 220. The wrapper 230 may hold the request from reaching an operating system 235 executing on the device 105-*a*. The wrapper 230 may also aggregate the intercepted system call with other system calls intercepted from additional applications. The wrapper 230 may hold the aggregated system calls from reaching a socket layer 240 of the operating system 235. When a system call for network access reaches the socket layer 240, the process to establish a communication channel using one or more of the radios 250-*a* may be initiated. The socket layer 240 may process the request and notify a particular radio to begin the connection setup procedure to establish a connection between the application that initiated the request and the network 115. For example, the socket layer 240 may issue calls (or requests) to establish a binding between a particular application and a radio, for example radio 1 250-*a*-1. Radio 1 250-*a*-1 may begin transmitting signals to the network 115 to begin the connection setup procedure by establishing a control channel, which may be an example of the control channel 110-*a*-1 of FIG. 1.

When the aggregated requests are released together to the socket layer 240, socket layer functions may be initiated a single time to establish a connection between the applications that sent the requests and a particular radio 250-*a*, rather than initiating the setup procedures each time an application provides a system call for network access. The selected radios may then begin network signaling to establish a data connection with the network 115 and the applications that originated the requests.

Thus, the device architecture 200 provides aggregation of system calls access a network by applications executing on the device 105-*a*. The aggregation may serve to reduce battery consumption and network signaling by releasing a number of system calls as a bundle to the socket layer 235.

Figure 3:
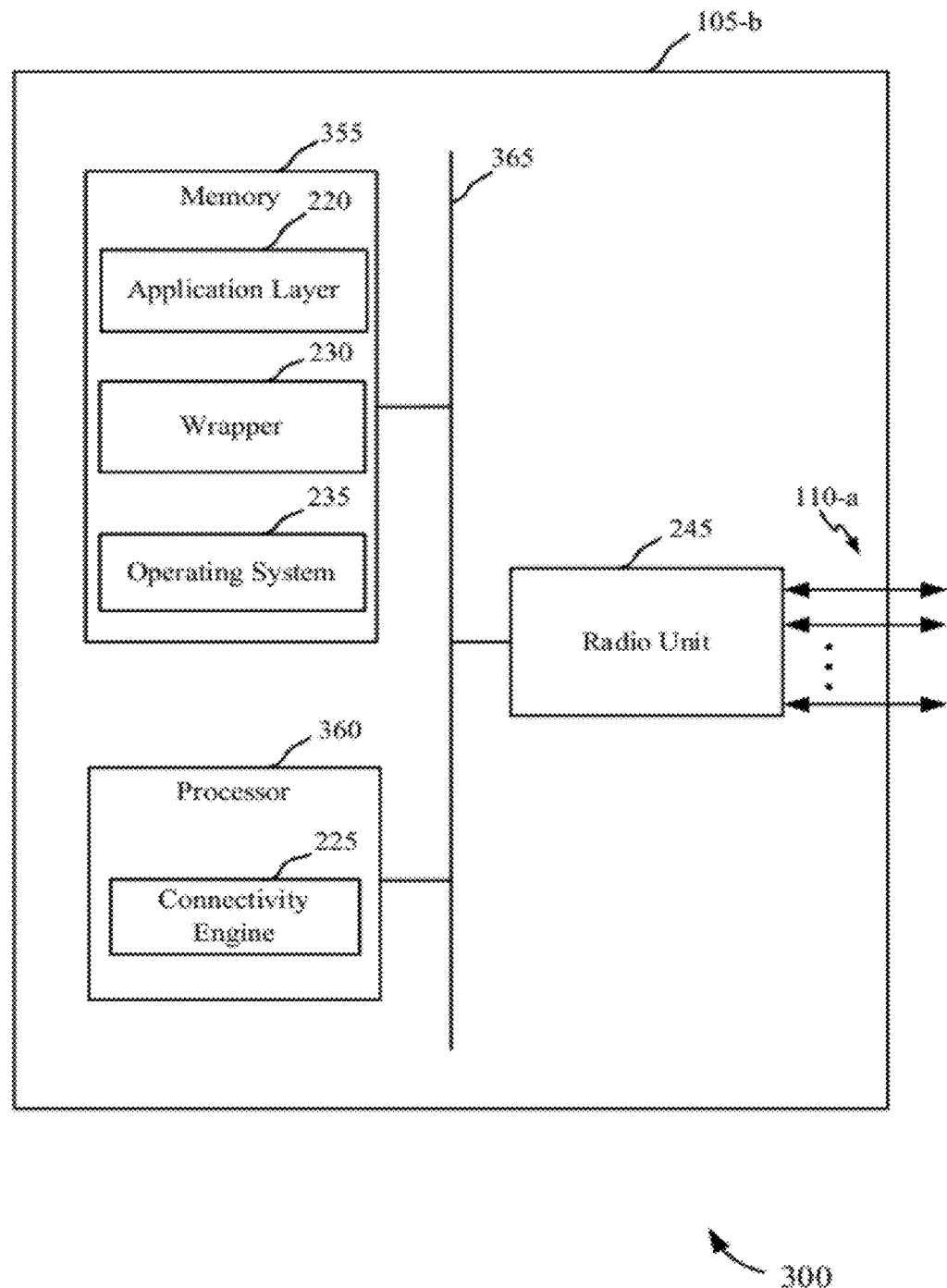
FIG. 3 shows a block diagram of a mobile device providing delaying of requests for network access.

FIG. 3 shows a block diagram 300 of a mobile device 105-*b* implementing the holding and aggregation of requests for network access. The device 105-*b* may be an example of the device 105 of FIG. 1 or 2. The device 105-*b* may include a processor 360, memory 355, an application layer 220, a wrapper 230 a connectivity engine 225, an operating system 235, and a radio unit 245 all coupled to communicate using a communication bus 314. The memory 355 may store the application layer 220, the wrapper 230 and the operating system 235. The processor 360 may include the connectivity engine 225. The connectivity engine 225 may be implemented as a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. The connectivity engine 225 may include means for intercepting a request from an application on a mobile device, means for holding the request from reaching an operating system on the mobile device, and means for releasing the request to the operating system upon detecting a triggering event. Further, the connectivity engine 225 may include means for aggregating the request with other intercepted requests to perform a communication for the mobile device 105. The connectivity engine 225 may also include means for executing the wrapper 230 of FIG. 2, 3, or 4. The executed wrapper may intercept a request from an application. In addition, the engine 225 may include means for identifying the application as a class of application from which requests are held. Further, the connectivity engine 225 may include means for identifying the application as a critical application or a non-critical application, and means for holding only requests from non-critical applications. It should be noted that the device 105-*b* is just one implementation and that other implementations are possible.

In one aspect, processor 360 includes at least one of a central processing unit (CPU), processor, gate array, hardware logic, memory elements, and/or hardware executing software. The processor 360 operates to control the operation of the device 105-*b* so that system calls for network access initiated by applications executing at the application layer 220 may be held from reaching the operating system 235 and aggregated with other system calls. In one implementation, the processor 360 may execute computer-readable instructions related to performing any of a number of functions. For example, the processor 360 may operate to analyze information received or communicated from the device 105-*b* to effectuate the interception and aggregation of requests for network access. In another aspect, the processor 360 may operate to generate information that may be utilized by the memory 355, radio unit 245, application layer 220, the wrapper 230 operating system 235, and/or connectivity engine 225 to effectuate aggregation of system calls for network access from a number of applications.

The radio unit 245 may include hardware and/or a processor executing software that may provide a number of radios/interfaces that may be used to interface the device 105-*b* with a number of external entities, such as external communication networks using a number of channels 110-*a*. For instance, radio unit 245 may provide radios/interfaces to communicate using Cellular, WiFi, Bluetooth, or any other technologies to communicate with communication networks using the channels 110-*a*.

The application layer 220 may include hardware and/or a processor executing software that may store and/or execute one or more applications on the device 105-*b*. In one implementation, the application layer 220 may allow applications to initiate networking function calls to request networking services, such as requesting connection to a radio/interface for the purpose of communicating with an external network or system.

The operating system 235 may include a socket layer. The socket layer may include hardware and/or a processor executing software that may perform socket layer functions. In one implementation, the socket layer functions may include such functions as Connect( ) Bind( ) and Setsockopt( ). A Connect( ) function operates to establish a connection between an application and a particular radio/interface. For example, the particular radio/interface may be selected from the number of candidate radios provided by the radio unit 245. In one aspect, the socket layer may perform a variety of socket layer functions or commands.

The connectivity engine 225 may include hardware and/or a processor executing software that may execute the wrapper 230 to cause the wrapper to intercept a request for network access from an application executing on the mobile device 105-*b*. The wrapper 230 may also hold the intercepted request from reaching the operating system 235. In addition, wrapper 230 may aggregate the intercepted request with other intercepted requests. The aggregated requests may be released to the socket layer of the operating system when a triggering event occurs (e.g., the mobile device 105-b enters an active mode).

The connectivity engine 225 may cause the wrapper 230 to capture, hold, and aggregate requests for network access in various ways. For example, when the device 105-b is in a background mode, the connectivity engine 225 (via the wrapper 230) may intercept a number of requests from a number of applications executing on the device 105-a. The intercepted requests may be aggregated together and held until a certain triggering event occurs. For example, requests may be released when the mobile device 105-b enters an active state. In one configuration, the aggregated requests currently being held may be released together. For example, the aggregated requests may be bundled and released together to the socket layer as a single system call. The socket layer may initiate procedures to establish communication channels for data connection with the network 115.

The memory 355 may include RAM, ROM, EEPROM or any other type of memory device that operates to allow information to be stored and retrieved at the device 105-b. In one implementation, the memory 355 may store computer-readable instructions executed by the processor 360. Memory 355 may also store any of a number of other types of data including data generated by any of the processor 360, radio unit 245, application layer 220, wrapper 230, operating system 235, and/or connectivity engine 225. Memory 355 may include a number of different configurations, including as random access memory, battery-backed memory, hard disk, magnetic tape, etc. Various features may also be implemented upon memory 355, such as compression and automatic back up.

In various implementations, the device 105-b may include a computer program product having one or more program instructions ("instructions") or sets of "codes" stored or embodied on a non-transitory computer-readable medium. When the codes are executed by at least one processor, for instance, processor 360 and/or the connectivity engine 225, their execution may cause the processor 360 and/or the connectivity engine 225 to control the device 105-b to provide the functions of the aggregation architecture described herein. For example, the non-transitory computer-readable medium may be a floppy disk, CDROM, memory card, FLASH memory device, RAM, ROM, or any other type of memory device or computer-readable medium that interfaces to the device 105-b. In another aspect, the sets of codes may be downloaded into the device 105-b from an external device or communication network resource. The sets of codes, when executed, operate to provide aspects of the system call aggregation architecture described herein.

Figure 4:
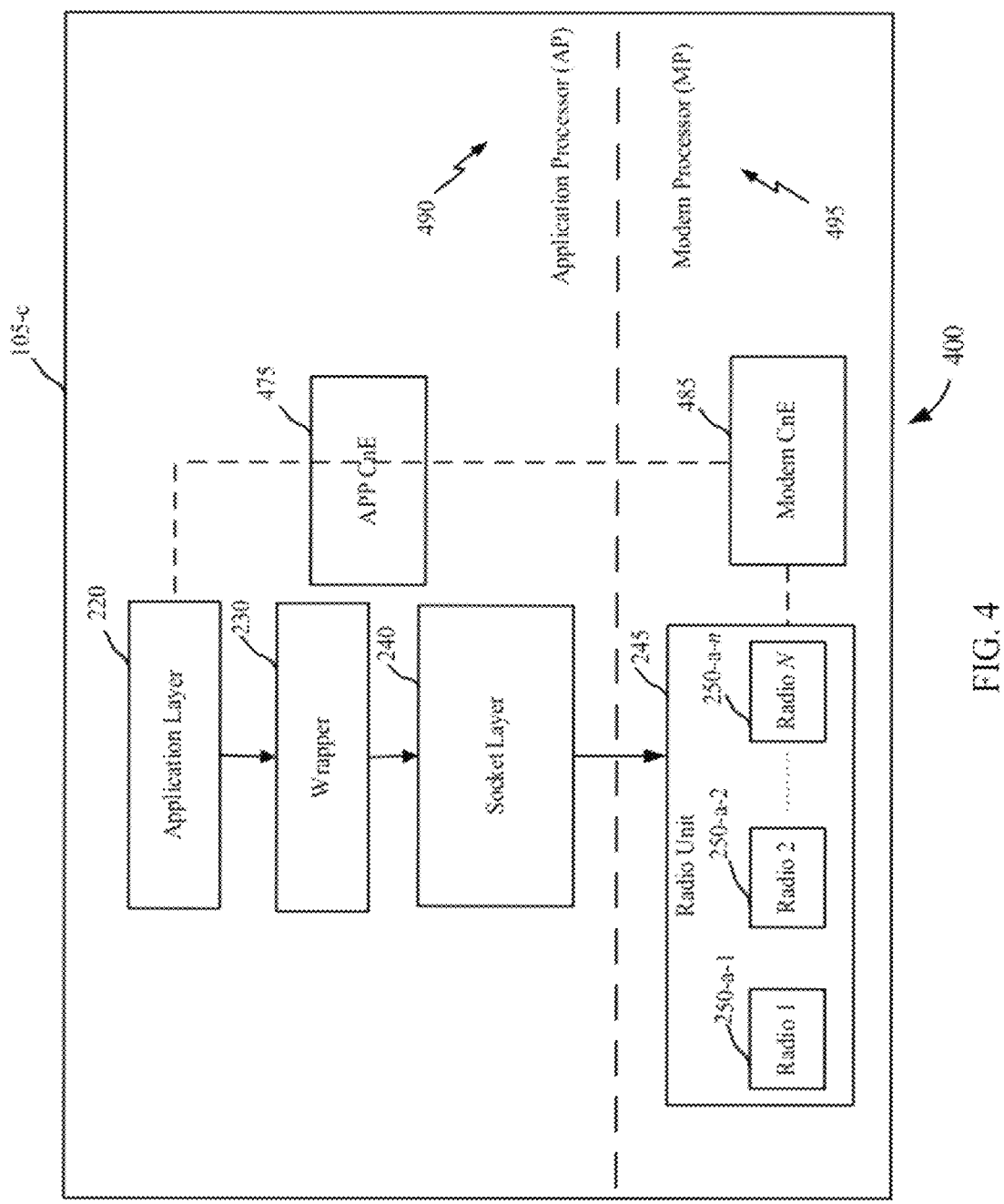
FIG. 4 shows a sample block diagram of architecture on a mobile device for delaying requests for network access.

FIG. 4 shows a sample block diagram 400 of an architecture on a mobile device 105-c useful for intercepting and aggregating requests for network access as described above. The mobile device 105-c may be an example of the mobile device 105 of FIG. 1, 2, or 3.

As shown, the blocks are divided between an application processor 490 and a modem processor 495, but the various functionality may be organized differently from the example of FIG. 4. An application layer 220 may interact with an application connection engine (APP CnE) 475 and a socket layer 240. The application connection engine 475 may communicate with a modem connection engine (Modem CnE) 485. The modem connection engine may manage communication resources such as a radio unit 245 and the number of radios 250-a therein. A wrapper 230 may be executed in the application processor 490 between the application layer 220 and the socket layer 240 of an operating system. The wrapper 230 may capture data passed between the application layer 220 and the socket layer 240. For example, the wrapper 230 may be placed between the application 220 and the socket layer 240 to intercept system calls sent from the application layer 220 and intended for the socket layer 240. In one configuration, the wrapper 230 may intercept system calls from the application layer 220 during a period of inactivity by the device 105-c and the wrapper may hold the intercepted call until a triggering event has occurred before releasing the system call to the socket layer 240. The system call may be a request to establish a communications channel using a radio 250 within the radio unit 245.

In another example, the wrapper 230 may aggregate system calls intercepted from the application layer 220 during a period of inactivity by the device 105-c. The wrapper 230 may hold the intercepted aggregated calls until a particular event has occurred before releasing the aggregated system calls to the socket layer 240 and ultimately the radio unit 245 for operation/transmission.

In one configuration, the wrapper 230 may be invisible to the applications at the application layer 220 so that the applications are unaware that their requests are being held from reaching the socket layer 240. The wrapper 230 may be a separate software component or may be incorporated into another component such as the connectivity engine 225 or the application connection engine 475.

Figure 5:
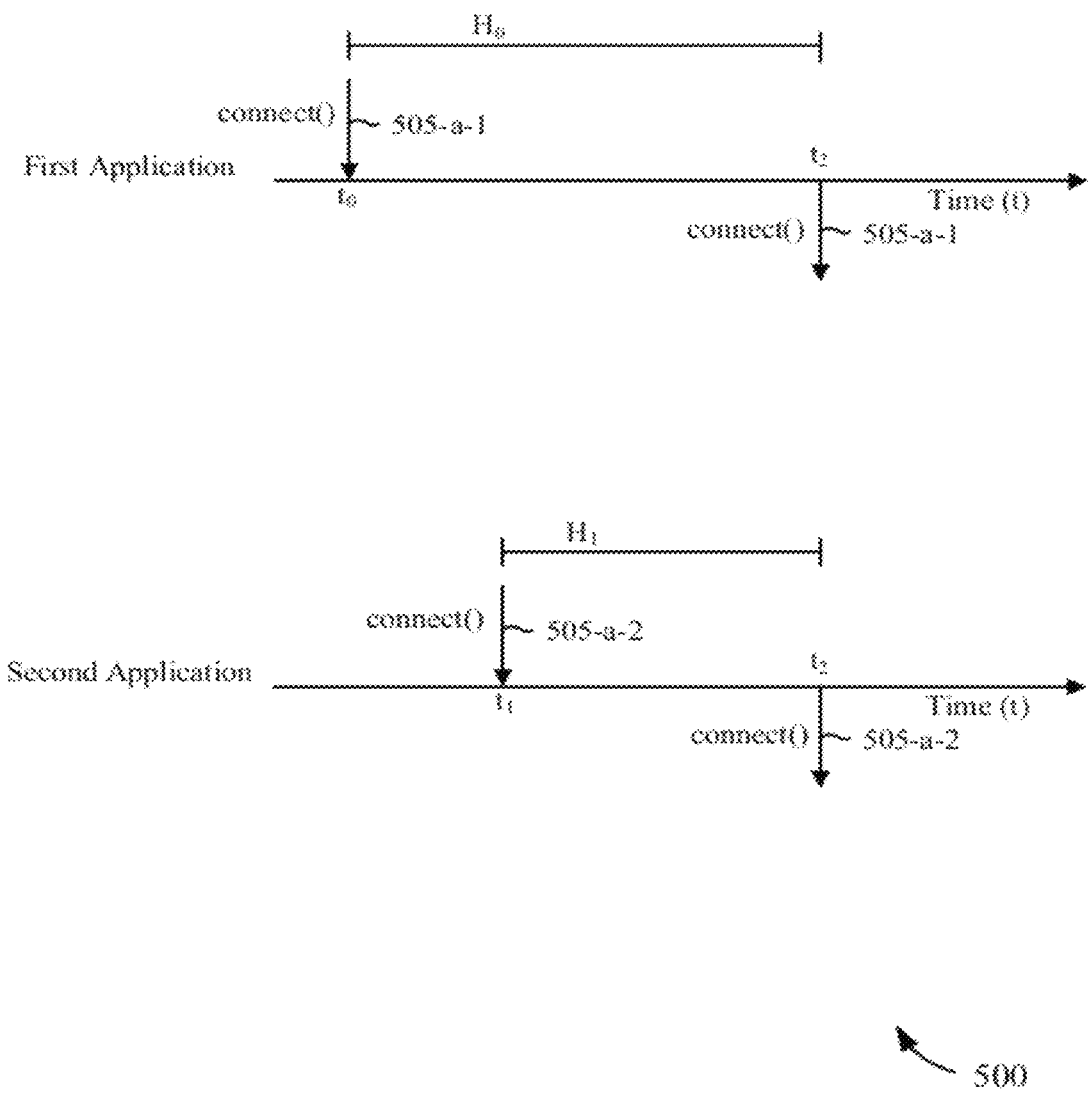
FIG. 5 shows an example timing diagram for aggregating requests for network access.

FIG. 5 shows timing diagrams 500 for a number of applications, such as a first application and a second application. The applications may be located in the application layer 220 of the mobile device 105. The timing diagrams 500 may be the result of the implementation of the connectivity engine 225 of FIG. 2 or 3. In one configuration, a first request 505-a-1 may be sent from the first application at time $t_0$. The first request 505-a-1 may be a Connect( ) system call. The first request 505-a-1 may be held from reaching the operating system 235 executing on the mobile device. For example, the first request may be held from reaching a TCP/IP stack of the operating system. The time the request is held may be represented as $H_0$. The first request 505-a-1 may be released to the operating system 235 at time $t_2$.

In one example, a second request 505-a-2 may be sent from the second application at time $t_1$. The time $t_1$ may be after the time $t_0$. The second request 505-a-2 may also be a Connect( ) system call. The second request 505-a-2 may be held from reaching the operating system 235 for a period of time represented as $H_1$. For example, the second request may also be held from reaching the TCP/IP stack of the operating system. The second request 505-a-2 may be released at time $t_2$. As a result, the first request 505-a-1 and the second request 505-a-2 may be released together or at the same time (i.e. time $t_2$). The time period $H_1$ may be less than the time period $H_0$. In other words, the second request 505-a-2 may be held for less time than the first request 505-a-1.

In one configuration, during the time period $H_0$, the first request may be aggregated with the second request 505-a-2 when the second request 505-a-2 is intercepted at time $t_1$. The aggregation of the requests allows both requests to be released at substantially the same time (i.e., time $t_2$.). Thus, the timing diagram 500 illustrates that requests sent at different times ($t_0$ and $t_1$) may be held for different periods of time ($H_0$ and $H_1$) and then released at the same time ($t_2$).

Figure 6:
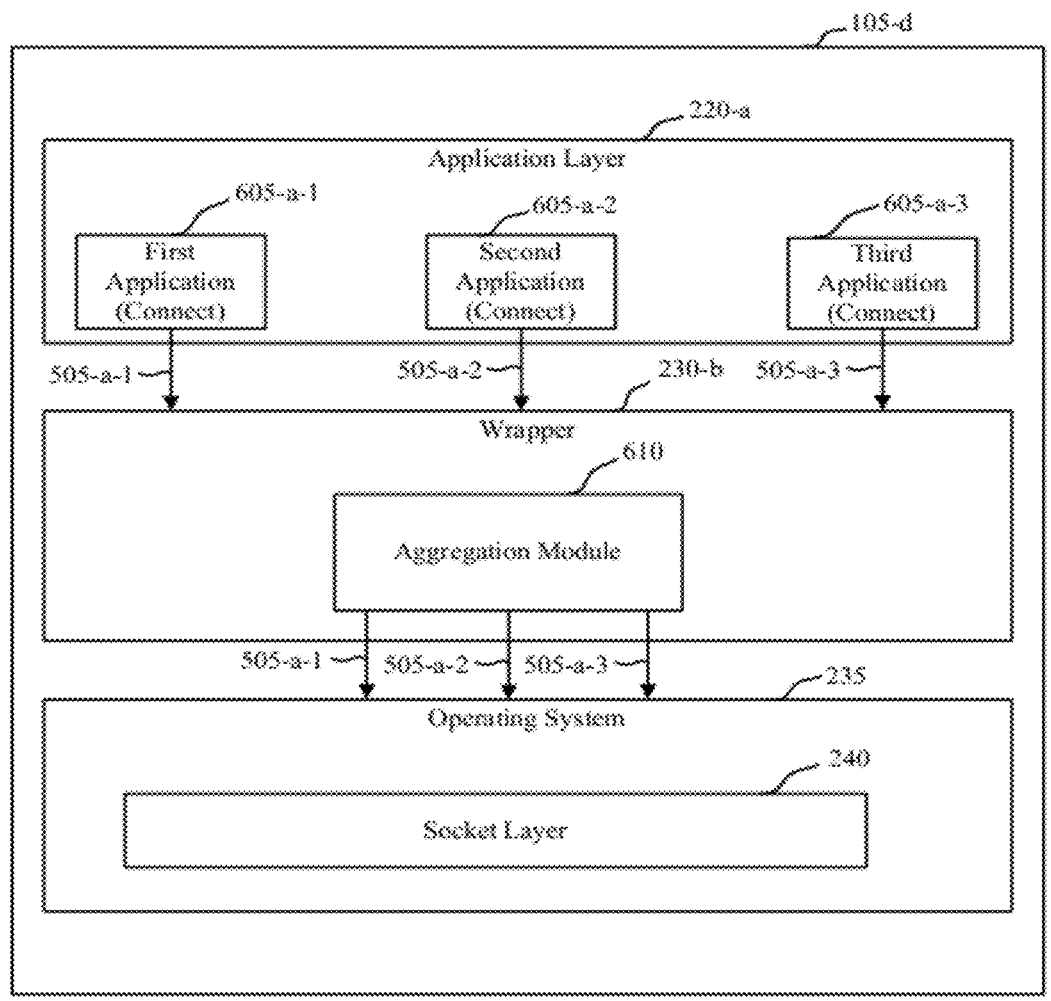
FIG. 6 shows one example of an architecture implemented on a mobile device.

FIG. 6 shows an example of an aggregation architecture that may be implemented on a mobile device 105-d. The mobile device 105-d may be an example of the device 105 of FIGS. 1, 2, 3, and 4. As illustrated, the device 105-d may include an application layer 220-a, a wrapper 230-b, and an operating system 235. The operating system 235 may include a socket layer 240. The connectivity engine 225 of FIG. 2 or 3 may execute instructions to run the wrapper 230-b software. In one configuration, the device 105-d may be in a background mode. The mobile device 105-d may be considered to be in a background mode when, for example, a screen or display of the device 105-d is off, when a microphone, speaker, or other audio output of the device 105-d is off, when a global positioning system (GPS) mechanism in the device 105-d determines the device 105-d is stationary, when the battery level of the device falls below a certain threshold level, etc.

In one example, a number of applications 605-a executing at the application layer 220-a may send a system call 505-a for network access, such as a Connect ( ) system call. The system calls 505-a may be sent from each application at different times. The wrapper 230-b may capture and hold these requests from reaching the operating system 235. In particular, the calls may be held from reaching the socket layer 240 of the operating system 235. In one configuration, an aggregation module 610 may aggregate the intercepted system calls 505-a. The aggregated requests may be released together (or at substantially the same time) from the wrapper 230-a-1 to the socket layer 240 of the operating system 235. Upon receiving the aggregated requests, the socket layer 240 may proceed to establish a connection with the network 115. The procedure may include transmitting signaling messages between the mobile device 105-d and the network 115 to establish a control channel 110-a-1.

Thus, the interception, holding, and aggregation, of requests for network access may reduce the power consumption of the mobile device 105-d because multiple system calls are not executed at the socket layer 240 at different times. Instead, the multiple requests are bundled together and released to the socket layer 240 at approximately the same time. Further, the aggregation of requests may reduce the frequency of connection setup procedures with the network 115, thus reducing the network traffic.

The holding and aggregation of requests from applications 605-a may be done selectively, (i.e., implemented such that a user may not be disrupted). A variety of factors may be employed to determine when to hold and aggregate requests from applications 605-a to establish communication channels. For example, the determination to intercept a request may be made based on certain characteristics of the mobile device 105-d such as the screen is off, or the audio output is off, etc. Holding requests may only be implemented for applications known to be able to handle such delays, when a radio is not loaded, when the mobile device 105-d is not otherwise in use (no phone calls, audio streaming, etc.). The interception and holding of systems calls from an application may be implemented based on whether a user subscribes to a service provided by the application. If the user subscribes to the service, the requests from the application may not be held from reaching the operating system. Instead, the requests from this subscription-based application may be allowed to pass immediately to the socket layer. In one example, applications executing on the mobile device 105-d may be classified. For example, the first application 605-a-1 may be classified as a non-critical application and the second application 605-a-2 may be classified as a critical application. A non-critical application may be an application with a certain delay tolerance. In other words, system calls from a non-critical application to establish a communication channel may be delayed. A critical application, however, may be an application with little or no delay tolerance. Examples of critical applications may include, but are not limited to, child tracking applications, emergency-based applications, subscription-based applications, etc. In one configuration, the holding an aggregation of requests may occur for requests originating from non-critical applications. Requests sent from critical applications may not be held (or aggregated), but may instead proceed directly to the socket layer of the operating system. The holding and aggregation may also be implemented utilizing a combination of the factors above or other factors.

Further, a variety of factors may be employed to determine when to release aggregated requests and permit application connectivity. For example, if there is a trigger to establish a data connection setup procedure (such as receiving a system call from a critical application, such as an emergency application that cannot be delayed), held requests may be released to the socket layer 240 so that communications channels may be established in conjunction with the emergency application and reduce the number of transitions between background and connected states. Another example is that when a more desirable radio is activated or selected as a default (e.g., a wide local area network (WLAN) radio), aggregated requests may be released. Requests may also be released if a radio channel is very good (e.g., high signal strength, SNR, or other desirable performance metrics). Requests may also be released periodically as predetermined or as selectively determined by the mobile device 105-d. Another heuristic to release the requests may be when the user approaches the device (before he/she turns the screen on) in order to operate incognito. In this example, an accelerometer may detect the user grabbing the phone, or a user proximity sensor may indicate the user is approaching. In another aspect, while running on batteries, requests may be released as soon as the screen is unlocked, (e.g., after a PIN is entered correctly). In this aspect, no release of requests may occur when a random button is pressed (device 105-d is in a purse or pocket).

In one example, a triggering event that causes a held request to be released may be the expiration of a timer. The event may also be a status change of a display. For example, the display may change from an "off" state to an "on" state. A status change of a microphone (off to on) may also be a trigger event. Further, a status change of a GPS sensor may be a triggering event. For example, the sensor may change states when it detects movement of the mobile device. Additional triggering events to release a request may include an indication that a universal serial bus port is in use or an indication that an audio equipment is connection to the device. In addition, an indication that a video equipment is connected to the mobile device may also serve as a triggering event to release a held request to the operating system of the mobile device. Further, an indication that a connection to a certain network is available may trigger the release of a request. For example, an indication that a connection to a Wi-Fi type of network may cause the request to be released. Similarly, an indication that a radio connection to a cellular type of network is already open may also trigger the release of the request to the operating system of the device. In yet another aspect, requests may be released according to some combination of the above or other factors. Although the preceding description is with respect to an API architecture, the concepts may equally apply in hardware, firmware, or any combination of hardware and software.

In one configuration, an application may be associated with a timer. The time period before the expiration of the timer may indicate the tolerance level of the associated application. For example, a timer which receives no tolerance, may be referred to as a "hard-timer". A hard-timer may be a timer which is intended to expire at a relatively fixed point in time. Conversely, a timer which does receive a tolerance value may result in a "soft-timer". A soft-timer may expire at an intended expiration time, but may also permit expiration within a specified tolerance range. As an example, certain applications such as an email update service may not require that connection requests occur at definite, fixed times. The timer for such an application may accordingly be given a wide tolerance and a soft-timer may be generated and associated with such applications. Conversely, a stock program used by a stock trader may require consistent updates at fixed times to ensure the accuracy of the stock quotes. Such an application may receive little or no tolerance and would accordingly be associated with a hard timer.

In one example, a timer, such as one of soft-timer or hard-timer, may be expiring. Once an expiration time has been identified, the connectivity engine 225 of FIG. 2 or 3, for example, may determine whether the expiration time falls within any soft-timer's tolerance of various applications. For all those soft-timers whose tolerance falls within the expiration time, the connectivity engine may execute instructions to force those timers to prematurely expire. Intercepted network access requests from the applications whose timers have expired may be released to the operating system of the mobile device. In some configurations, a network connection may remain open until each of the applications whose timers have expired completes their necessary communication activities. As communication requests are made when the timers expire, more efficient resource management will result as a consequence of the applications' shared usage of the communications system.

As mentioned above, an interval or refresh rate may be determined that indicates how often requests should be released. Intervals may be determined in order to maintain the state of middleboxes that perform firewall and NAT functions. The state of the middleboxes may be maintained by applications issuing keep-alive messages or a succession of shorter connection requests. In one configuration, the network may provide information about a minimum refresh rate to maintain the state in middleboxes on the mobile device. A refresh rate may be provided for UDP vs. TCP connections. The network may adapt the refresh rate in the middleboxes based on the radio load incurred due to the amount of keep-alive/reconnect messages. For example, if the number of keep-alive messages is above a certain threshold, the state may be maintained for a longer period of time in the middleboxes and the refresh rate for the mobile device may be slowed down. The interval (or refresh rate) may be less than a timeout value in the stateful middleboxes. As a result, the mobile device may open a gate to an uplink (i.e., release the requests) according to the refresh rate (or interval) indicated by the network. The gate may be opened when the device is not in the background mode and closed when the mobile device is in the background mode.

Figure 7:
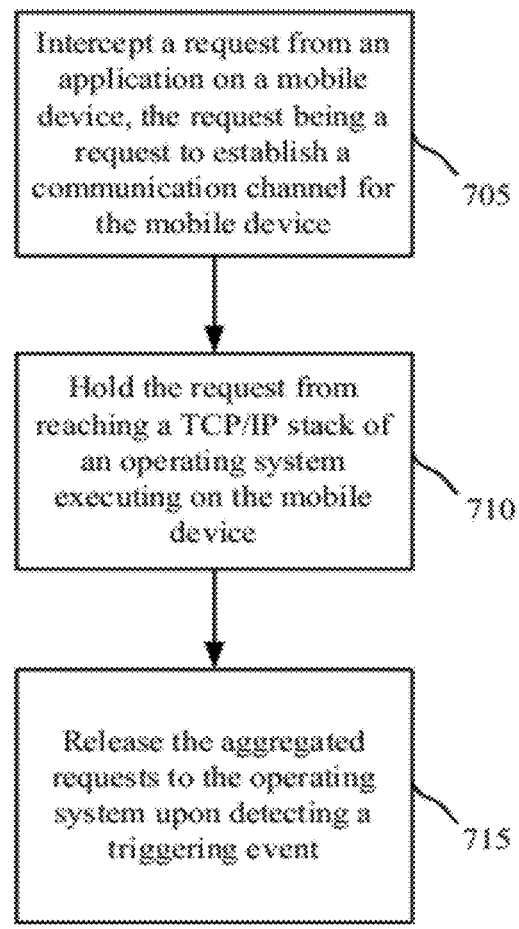
FIG. 7 is a flow chart illustrating one example of a method for delaying requests for network access.

FIG. 7 is a flow chart illustrating one example of a method 700 for holding requests for network access. For clarity, the method 700 is described below with reference to the mobile device 105 shown in FIG. 1, 2, 3, or 4. In one implementation, the processor 360 may execute one or more sets of codes to control the functional elements of the device 105 to perform the functions described below. In one configuration, the method 700 described below may be implemented when the device 105 is in a background mode.

At block 705, a request from an application on the mobile device 105 may be intercepted. The request may be a request to perform a communication for the mobile device, such as establish a communication channel for the mobile device 105. The request may be sent from an application executing at the application layer 220 of the mobile device 105. In one example, the request may be a request to initiate a data connection setup procedure to enable the application to interface with an external network, such as the network 115. For example, the request may be a system call to the socket layer 240 of the operating system 235 on the mobile device 105.

At block 710, the request may be held from reaching the operating system 235 executing on the mobile device 105. For example, the request may be held from reaching the socket layer 240 of the operating system 235. In one configuration, the wrapper 230 may intercept and hold the request.

At block 715, the request may be released to the operating system upon detecting a triggering event. For example, the device 105 may enter an active mode as described above.

Therefore, the method 700 may provide for interception and holding of requests for network access submitted by applications executing at the application layer 220 of the mobile device 105. It should be noted that the method 700 is just one implementation and that the operations of the method 700 may be rearranged or otherwise modified such that other implementations are possible.

Figure 8:
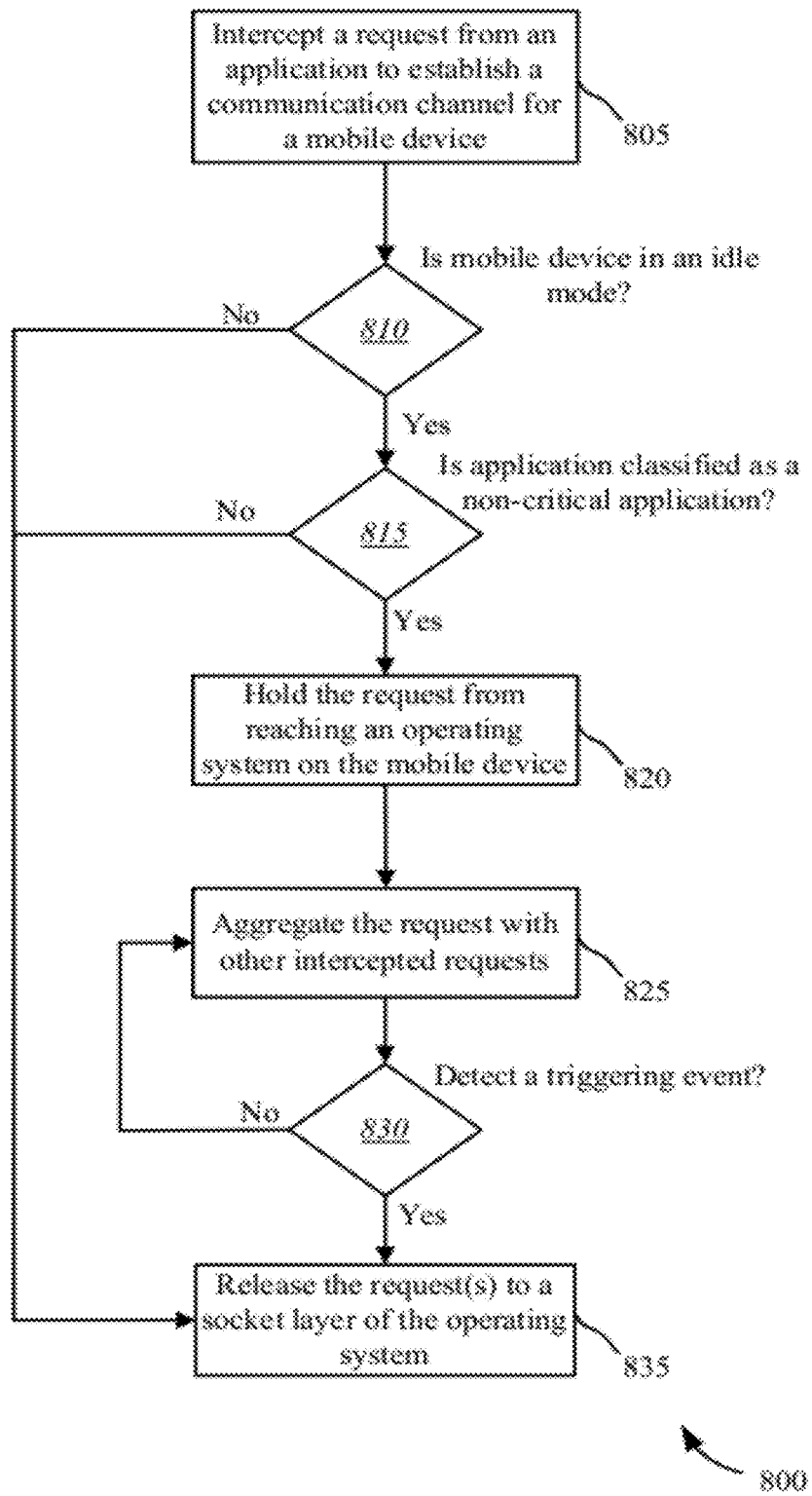
FIG. 8 is a flow chart illustrating one example of a method for delaying requests for network access based on a classification of an application.

FIG. 8 is a flow chart illustrating one example of a method 800 for intercepting requests for network access from non-critical applications executing on a mobile device. For clarity, the method 800 is described below with reference to the device 105 shown in FIG. 1, 2, 3, or 4. In one implementation, the processor 360 may execute one or more sets of codes to control the functional elements of the device 105 to perform the functions described below.

At block 805, a request for network access is intercepted. The request may be sent from an application executing at the application layer 220 of the mobile device 105. In one example, the request may be a request to establish a communication channel with an external network, such as the network 115. The request may be a system call to the socket layer 240 of the operating system 235 on the device 105. Upon receiving the request, the socket layer 240 may initiate procedures to establish the communication channel and provide a callback function to the application when the channel is established.

At block 810, a determination may be made as to whether the device 105 is in a background mode. For example, a determination may be made as to whether the device 105 is powered down, in a sleep mode, etc. The device 105 may also be determined to be in a background mode if, for example, the display of the device 105 is inactive, audio outputs are inactive, etc. If it is determined that the device 105-*a* is inactive a second determination may be made at block 815 to determine whether the application that initiated the system call is a non-critical application. A critical application may be an emergency application with a priority for network access, an subscription-based application, an application with a low tolerance for delay, etc.

If, it is determined that the device 105 is active or that the application is a critical application, the request may be released to the socket layer 240 of the operating system 235. In other words, the request may be released to allow the socket layer to initiate the procedures to establish a communication channel with the network 115. If it is determined that the device is in a background mode and the application is classified as a non-critical application, at block 820, the request may be held from reaching the operating system, and thus delaying the initiation of the procedures to set up a communication channel.

At block 825, the request may be aggregated with other intercepted requests. The other requests may be initiated by additional applications executing on the mobile device 105. At block 830, a determination may be made as to whether a triggering event is detected, as described above. If it is determined that no triggering event is detected, the method 800 may return to continue to aggregate intercepted requests for network access. If, however, it is determined that a triggering event is detected, at block 835, the aggregated requests may be released to the socket layer 240 of the operating system 240. In other words, system calls from a number of applications may be held and bundled together and then released as a single system call to the socket layer 240.

Therefore, the method 800 may provide for intercepting, holding, and aggregating requests for network access from non-critical applications executing on the mobile device 105. By holding and aggregating requests, a number of system calls may be bundled together and released as a single system call. This may result in battery power savings for the mobile device 105 as well as a reduction in network signaling because the quantity of system calls to initiate procedures to set up communication channels may be reduced. It should be noted that the method 800 is just one implementation and that the operations of the method 800 may be rearranged or otherwise modified such that other implementations are possible.

Figure 9:
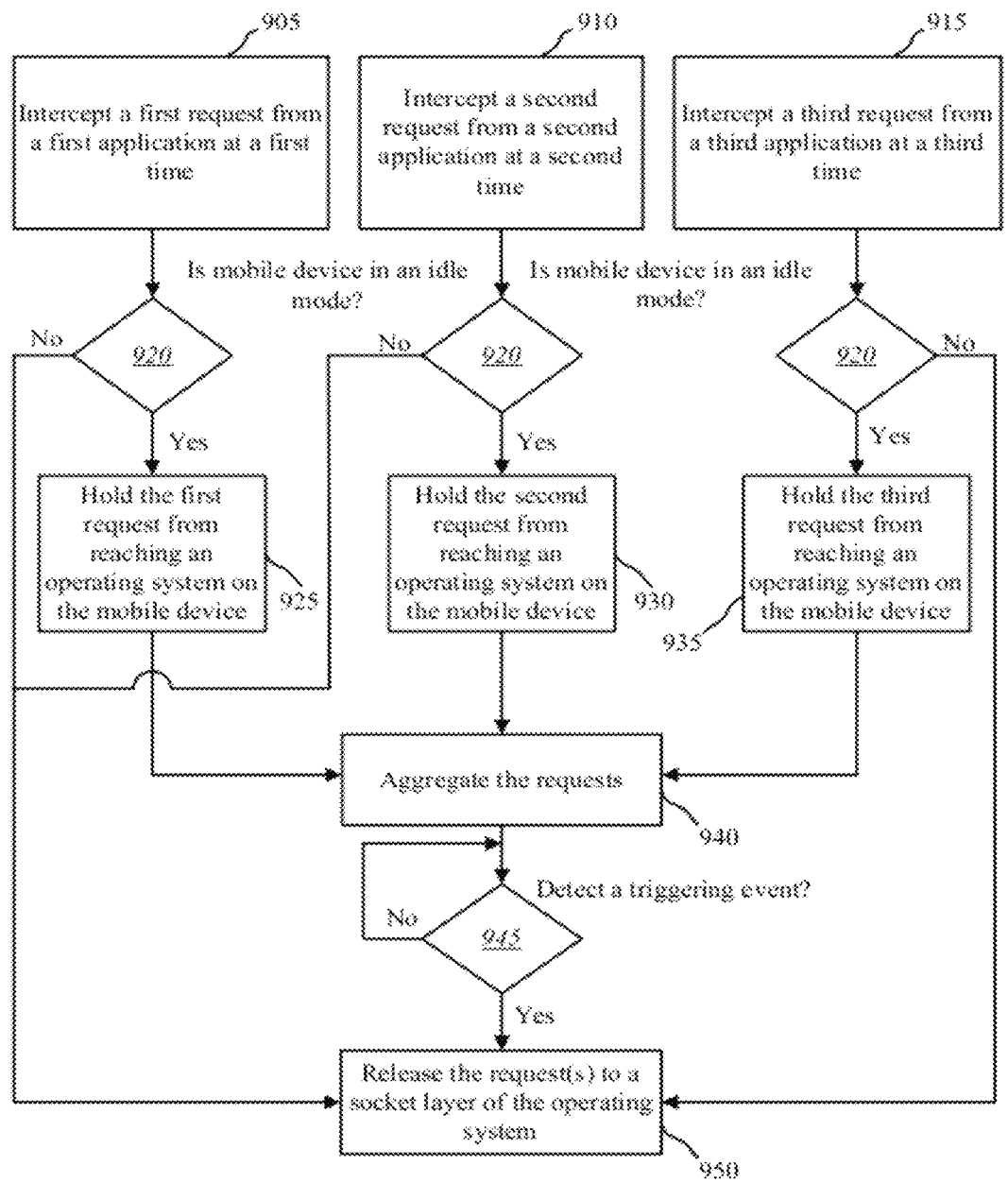
FIG. 9 is a flow chart illustrating one example of a method for aggregating requests for network access received from a number of mobile device.

FIG. 9 is a flow chart illustrating one configuration of a method 900 for intercepting requests for network access from a number of applications executing on a mobile device. For clarity, the method 900 is described below with reference to the device 105 shown in FIG. 1, 2, 3, or 4. In one implementation, the processor 360 may execute one or more sets of codes to control the functional elements of the device 105 to perform the functions described below.

At block 905, a first request for network access is intercepted from a first application at a first time. In one example, at block 910, a second request may be intercepted from a second application at a second time. The second time may be different than the first time. At block 915, a third request may be intercepted from a third application at a third time. In one configuration, the third time may be different than the first time and the second time. The intercepted requests may be system calls to establish communication channels for network access. The applications may be executing on the mobile device 105.

When a request is intercepted, a determination may be made at block 920 as to whether the mobile device 105 is in a background mode. If it is determined that the device 105 is in a background mode, the requests, at blocks 925, 930, and 935 may be held from reaching the operating system. If the device 105 is in an active mode, the requests may be released to the socket layer 240 of the operating system 235 on the mobile device 105 at block 950.

In one configuration, at block 940, the first, second, and third requests may be aggregated or bundled together. A determination may be made at block 945 as to whether a triggering event has occurred. For example, a determination may be made as to whether the device has entered an active mode, a display on the device has been activated, the device has changed location, a user is near the device, and the like. If a triggering event is not detected, the method 900 may return to continue monitoring for the detection of a triggering event. If a triggering event is detected, a block 950, the aggregated requests may be released to the socket layer of the operating system. Upon receiving the requests, the socket layer may initiate procedures to establish a communication channel with an external network, such as the network 115.

Therefore, the method 900 may provide for intercepting, holding, and aggregating requests for network access from multiple applications executing on the mobile device 105. As a result, a number of system calls may be bundled together and released as a single system call. This may result in reduced battery consumption for the mobile device 105 as well as a reduction in network signaling because the quantity of system calls may be reduced. It should be noted that the method 900 is just one implementation and that the operations of the method 900 may be rearranged or otherwise modified such that other implementations are possible.

Figure 10:
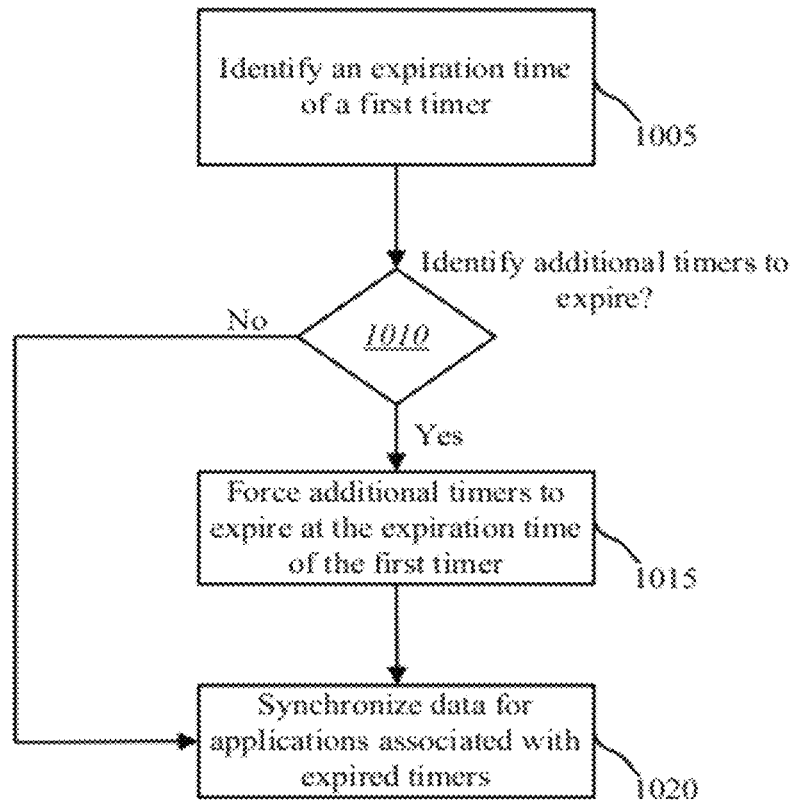
FIG. 10 is a flow chart illustrating one example of a method to synchronize data connection requests.

FIG. 10 depicts one possible process 1000 implemented in certain embodiments for improving synchronization among application connection requests, such as network access requests. Certain embodiments, such as discussed in the below example, may implement the process 1000 on a mobile device. For clarity, the method 1000 is described below with reference to the device 105 shown in FIG. 1, 2, 3, or 4. In one implementation, the processor 360 or connectivity engine 225 of FIG. 2 or 3 may execute one or more sets of codes to control the functional elements of the device 105 to perform the functions described below.

The method begins at a block 1005, by identifying that a first timer, such as one of soft-timer or hard-timer, may be expiring. This may be accomplished by a central system which polls the timers of various applications. Alternatively, each application may individually monitor its own timer and provide notification upon the timer's expiration.

Once an expiration time has been identified, a determination may be made at block 1010 as to whether additional timers are identified that may also expire. For example, a determination may be made as to whether the expiration time of the first timer falls within any soft-timer's tolerance. For all those soft-timers whose tolerance falls within the expiration time, at block 1015, the additional timers may be forced to prematurely expire. At block 1020, data may be synchronized for applications associated with expired timers. For example, channel access may be provided to the applications whose timers have expired by forming a connection. In some embodiments, the connection may then remain open until each of the applications whose timers have expired completes their necessary communication activities. As communication requests are made when the timers expire, more efficient resource management will result as a consequence of the applications' shared usage of the communications system. The method 1000 may be performed indefinitely by again waiting for timers to expire at a block 1005 or the method may end.

The timer or timers which have initially expired at block 1005 at their intended time may be referred to as "master timers", or interchangeably "trigger events", in certain embodiments. That is, these timers dictate when other timers ("soft-timers") may expire based upon their respective tolerances. Thus, a soft or hard-timer may serve as a master timer. However, only soft-timers may be affected by a master timer (as only soft-timers possess a tolerance).

Figure 11:
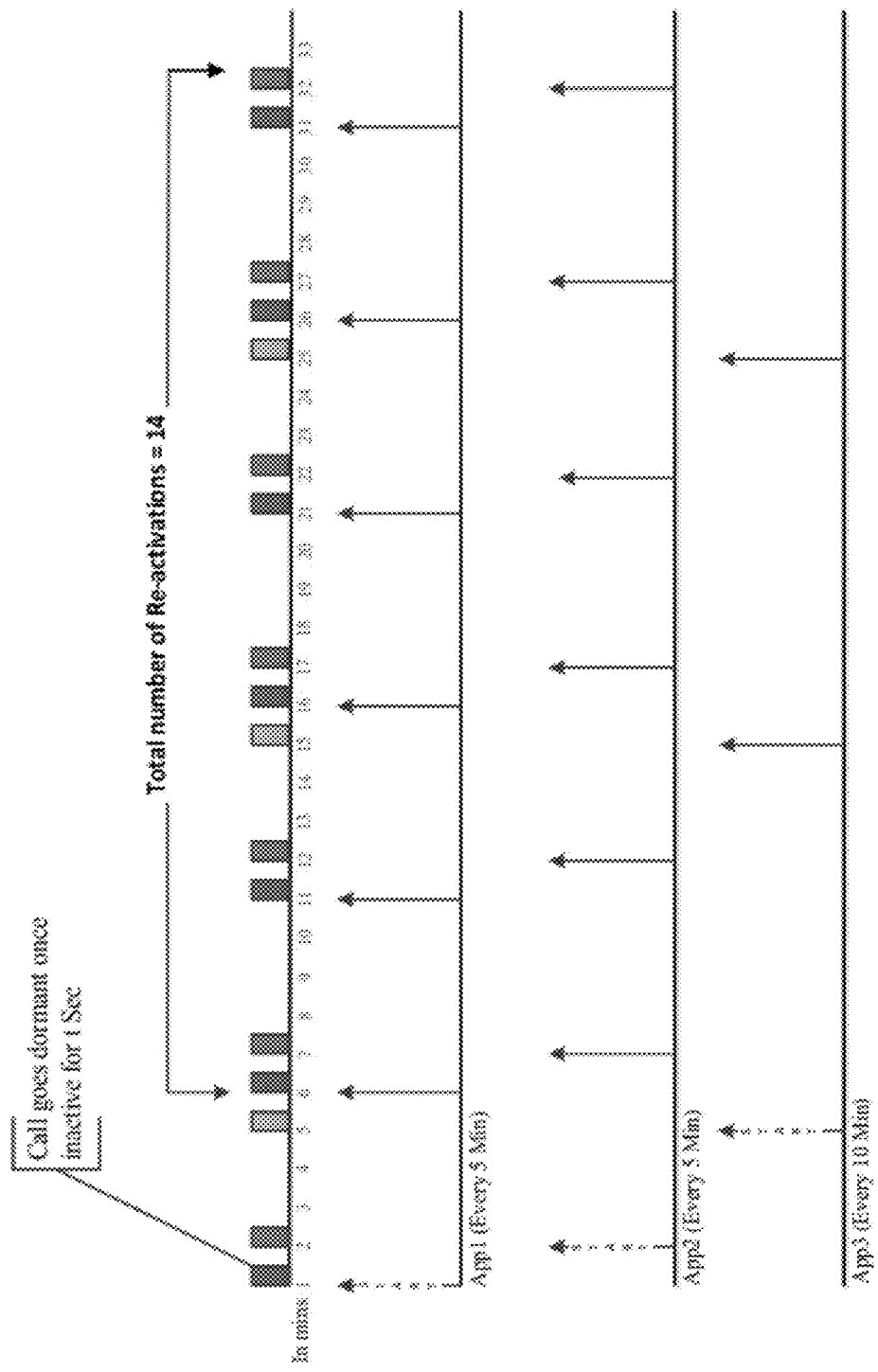
FIG. 11 illustrates a timing diagram wherein three applications periodically initiate connection requests.

FIG. 11 illustrates one possible series of connection requests for each of three applications (App1, App2, and App3). These applications may be run on a mobile device, such as the mobile device 105 of FIG. 1, 2, 3, or 4. Particularly, FIG. 11 represents techniques for forming connections based on communication requests from various applications. In this example, connection requests are not coordinated. Therefore, each application requests a connection at uncoordinated intervals from the other applications. This lack of coordination results in an inefficient use of the mobile device's resources as the applications ignore opportunities to share connections. Timer expirations are represented by vertical arrows at each point in time and the consequent request periods are indicated by rectangles. Each connection period is represented by a window in the request period rectangle with a width of 30 seconds (one will recognize this as a rather arbitrary duration and much smaller or longer durations may occur for each connection). This width is merely for purposes of illustration, and arbitrary widths may be present in an actual device. The numerical ranges of FIG. 11, as well as the following figures, have been selected merely for explanatory purposes. The figures should not necessarily be construed as representing the actual implementation of any system or embodiment.

In FIG. 11, App1 may initiate a communication request every 5 minutes (connections at times 1, 6, 11, 16, etc.). Similarly, App2 may initiate connection requests every 5 minutes, but offset from App1 by one minute. That is, App2's requests share the same period, but not the same phase, as App1's requests. Finally, App3 may perform connections every 10 minutes and is likewise offset from App1 by 4 minutes. The asynchronous connection requests of App1, App2, and App3 result in an inefficient use of battery power and communication bandwidth as the connections are constantly brought up and down. In this example, fourteen separate connections (requiring reactivation of the mobile device's communication elements) with the communication system occur between time 6 and time 32.

Certain of the present embodiments contemplate providing a system which may coordinate connection requests such that more efficient connection patterns arise. For example, if the mobile device 105 already has a connection with a network for one application, the mobile device 105 may use the same connection for another application without tearing down the connection and forming another. Thus, coordinating the timing between application connection requests so that applications share connections may reduce the number of connections that need to be formed. Certain of these embodiments may include a programming module which application developers may use when implementing applications for the platform operating on mobile device 105. In certain of these embodiments, the mobile device 105 may transmit information for scheduling to the network. In many embodiments, the applications running on the mobile device 105 may include "timers", i.e. software, firmware, or hardware modules configured to determine when a particular "expiration time" has occurred. The timers may be executed by the connectivity engine 225 of FIG. 2 or 3. The timers may be implemented as part of the connectivity engine 225. These timers indicate a time or time interval within which the application may require a connection. Applications requiring periodic updates from a network (or which periodically transmit information to the network) may rely on these timers to determine when they should request a connection. Applications may also require data non-periodically and request data within a certain time defined by a timer. Some applications may be flexible in how often they require a connection. Certain of the present embodiments contemplate different types or configurations of timers to accommodate the flexibility, or lack thereof, associated with each application. Though the following description refers to an application as having a "timer" for ease of discussion, one skilled in the art will recognize that an application comprises many components which may themselves be individually associated with one or more timers.

Figure 12:
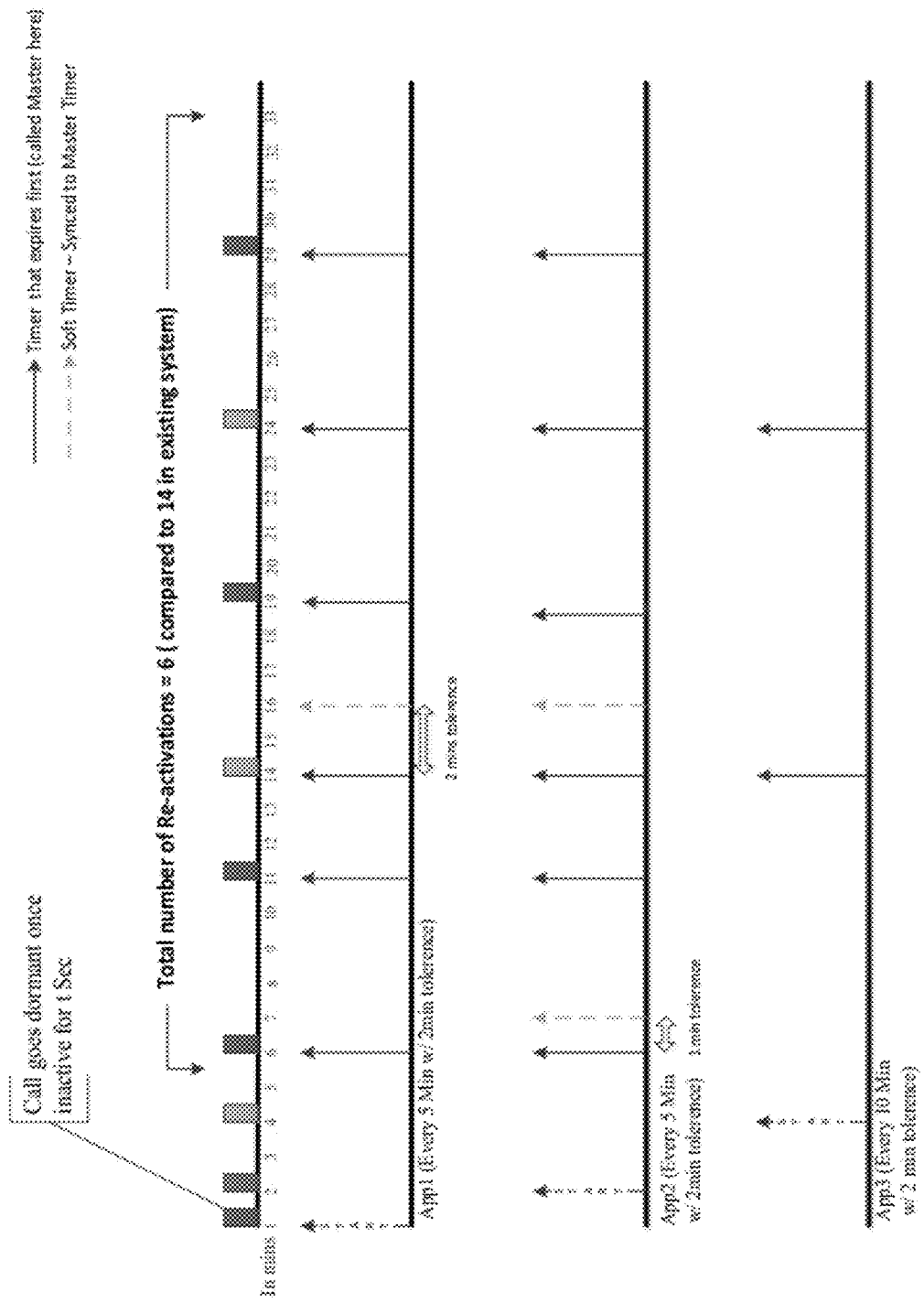
FIG. 12 illustrates the timing diagram of FIG. 11, wherein certain of the connection requests have been synchronized.

FIG. 12 represents a timing diagram for the applications from FIG. 11, but wherein the applications now employ either soft or hard-timers in conjunction with a process such as the method of FIG. 10. As discussed above, the applications may run on a mobile device, such as the mobile device 105 of FIG. 1, 2, 3, or 4. Further, the connectivity engine 225 of FIG. 2 or 3 may implement process 1000 to coordinate scheduling. In the example of FIG. 12, each of applications (App1, App2, and App3) include a soft-timer with a 2 minute tolerance. Timer expirations as they would have occurred in FIG. 11, in the absence of a process such as process 1000, are indicated by dashed arrows. Solid arrows represent the timer expirations that do occur under the management of a process such as process 1000. In some embodiments, the process 1000 may be performed at each time interval (i.e., at minutes 1, 2, 3, etc.)

For example, at time 7, App2's soft-timer would normally have expired. However, as App1's timer expired at time 6, which is within the two minute tolerance of App2's soft-timer, soft-timer of App2 prematurely expired at time 6. Similarly, the expiration of clock of App3 at time 14 falls within the two-minute tolerances of the clocks for both App1 and App2. By time 19, since each of the clocks for App1, App2, and App3 have periods which are either equal or which are harmonics of one another (5 minutes, 5 minutes, and 10 minutes respectively), the clocks become exactly in phase (communication requests subsequently occur at times 19, 24, and 29, with the master clocks having no effect on the other applications), resulting in a much more efficient utilization of the communication resources. Generally, if timers share equal periods, or if their periods are harmonics (i.e., multiples) of one another, they may, barring interference from the expiration of other "master" timers, remain in phase with one another perpetually (of course, the synchronization may also be disrupted if the periodicity of any of the applications' timers change). Thus, this example illustrates that 6 rather than 14 connection requests occur between minutes 6 and 33 as compared to the timing diagram FIG. 11 when the process is not applied.

Figure 13:
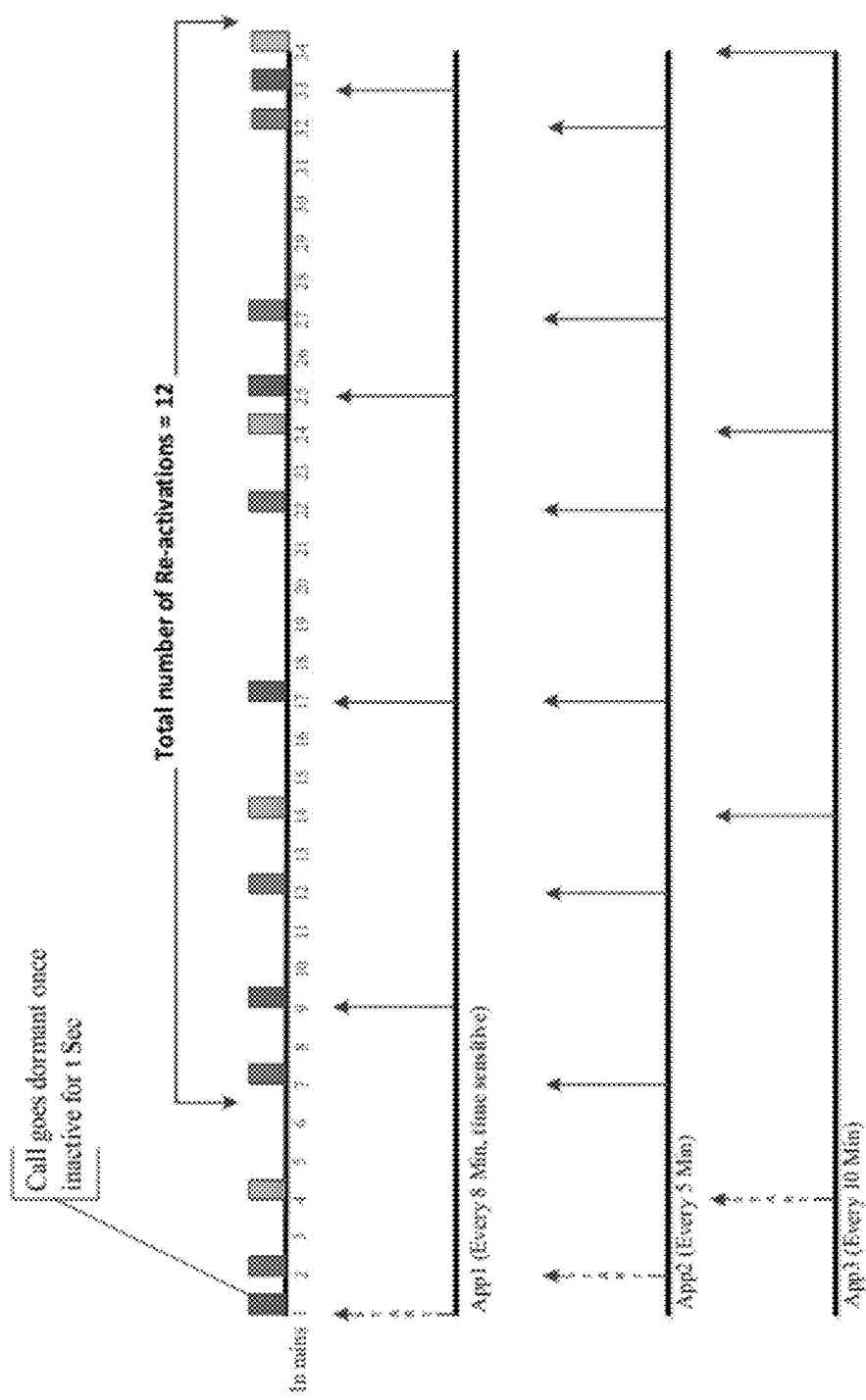
FIG. 13 illustrates a timing diagram wherein three applications periodically initiate connection requests.

As another example, FIG. 13 depicts another situation wherein applications (App1, App2, and App3) do not possess the same periods (8 minutes, 5 minutes, and 10 minutes respectively). As in the timing diagram of FIG. 11, the connection requests in FIG. 13 reflect the conventional, uncoordinated, technique employed by most applications. This lack of coordination results in an inefficient use of the mobile device's resources, resulting in the reactivation of the mobile device's communication resources 12 times between minutes 7 and 34.

The applications of FIG. 13 differ from FIG. 11 in that App1 of FIG. 13 is time sensitive. A developer or system designer, wishing to employ the benefits of certain of the present embodiments, would likely generate a timer having little or no tolerance for App1 of FIG. 13. Accordingly, a hard-timer may be used for App1. App2 and App3 of FIG. 13, in contrast are not as time sensitive and accordingly may be accommodated by soft-timers. In FIG. 13, App 2 and App3 are each given soft-timers with a tolerance of 2 minutes.

Figure 14:
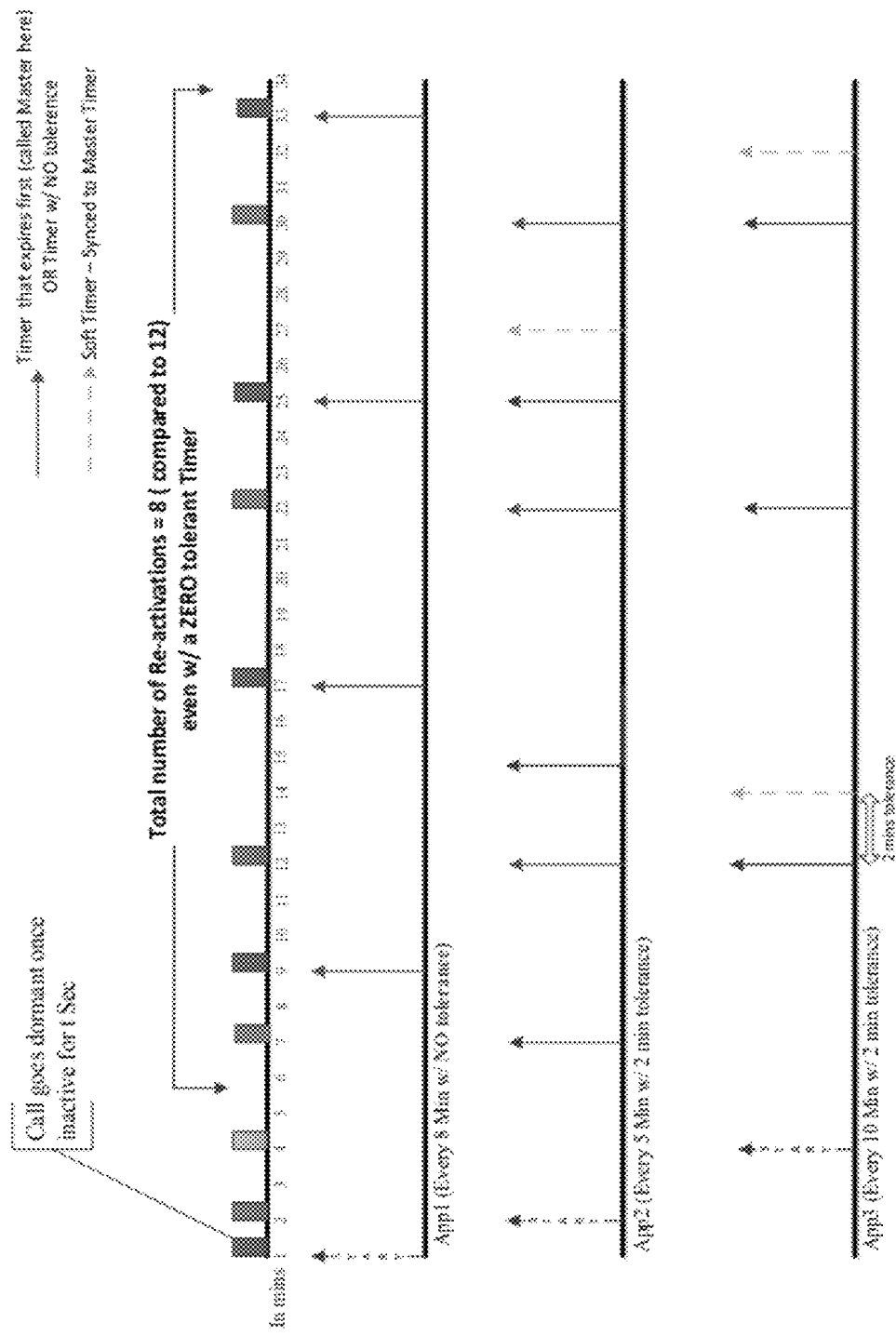
FIG. 14 illustrates the timing diagram of FIG. 13, wherein certain of the connection requests have been synchronized.

FIG. 14 depicts the effects of applying a process such as process 1000, but this time to the applications of FIG. 13. The timer of App1 of FIG. 14, as it is a hard-timer, remains the same as App1 of FIG. 13 in the timing diagram FIG. 13. App3 of FIG. 14, however, prematurely expires based on the expiration of App2's timer at time 12, as App2's expiration is within two minutes of App3's intended expiration time. Subsequently, App2 is synchronized with App1 at time 25 and App3 is synchronized with App2 at time 30. As discussed above, the applications may run on mobile device 105 of FIG. 1, 2, 3, or 4. Further, the mobile device 105 may implement process 1000 to coordinate scheduling. This example illustrates how the previous synchronization of one clock (App2 at time 25 based on App1) may affect the subsequent synchronization of another clock (App3 at time 30 based on App2). As the periods of applications clocks are not equal, or harmonics, the clocks may not be exactly synchronized in perpetuity. Still, this example illustrates that 8 rather than 12 connection requests occur between minutes 6 and 33 as compared to the timing diagram of FIG. 13 when a process, such as the process 1000, is not applied.

Master clocks may be prioritized based upon the application with which they are associated. That is, an application which consumes a great deal of bandwidth or battery power may be less suitable for sharing resources than an application which consumes less bandwidth or battery power. Thus, in certain embodiments, the mobile device 105 may be adjusted so that process 1000 considers the behavior and/or corresponding priority of the "master" timers which have expired before prematurely expiring soft-timers having a tolerance in the appropriate range. As an example, the process may further consider the bandwidth requirements for each of applications whose timers expired at block 1005 (i.e. the master timers) in comparison with the bandwidth requirements of the applications whose tolerance permits the premature expiration of their timers. If the cumulative bandwidth requirements of the applications with master timers mitigate against their shared use of the channel with the other applications, mobile device 105 may take appropriate action. For example, a connection request may be made at the applications with master timers allowed to perform their operations. The soft-timers may then be made to expire at an appropriate time (possible after their intended expiration time if permitted by their tolerance) so that these applications take advantage of the existing connection once the master timer applications no longer consume excessive bandwidth. Alternatively, the soft-timers' expiration may be delayed until a new connection request has been made that will employ less bandwidth or until the end of their tolerance.

In certain of the embodiments described above, such as were discussed with reference to FIGS. 11 and 13, timer expiration is shown to occur at the leading edge of communication windows. Certain embodiments instead contemplate performing an analysis at the "trailing edge" of a data connection, i.e. when communication with a node is about to go dormant. As costs are involved in both opening and closing a connection, mobile device 105 may execute a process similar to process 1000 before closing a connection to see if any applications are intending to open a connection and could instead make use of the existing connection, rather than initiate a new request once the present connection is closed.

Employing the techniques and structures disclosed herein, a mobile device may employ a software layer (for illustrative purposes, called a wrapper) which provides an application program interface (API) to capture system calls from applications and hold them from reaching the operating system. The captures calls may be aggregated so that frequent waking of the mobile device may be reduced and other communication resources conserved during periods where the user is not actively engaged with the mobile device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a number of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a non-transitory computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the invention. Various modifications to these exemplary embodiments will be readily apparent to those skilled in the art, and the generic principles defined herein may be applied to other embodiments without departing from the spirit or scope of the invention. Thus, the invention is not intended to be limited to the exemplary embodiments shown herein but is to be accorded the widest scope consistent with the principles and novel features disclosed herein.

What is claimed is:

1. A method for wireless communication in a mobile device, comprising:
   identifying each of a plurality of applications on the mobile device as a critical application or a non-critical application, wherein a first application from the plurality of applications is identified as a non-critical application;
   intercepting a request from the a first application on the mobile device, the request being a request to establish a communication channel to perform a communication for the mobile device;
   delaying, when the mobile device is in a background mode, the request from the first application based at least in part on the first application being identified as a non-critical application, wherein the delaying holds the request from reaching a Transmission Control Protocol/Internet Protocol (TCP/IP) stack of an operating system executing on the mobile device, an amount of the delaying based at least in part on a delay tolerance associated with the first application; and
   releasing the request from the first application to establish the communication channel to the operating system upon detecting a triggering event, wherein the triggering event is the mobile device entering an active mode.

2. The method of claim 1, further comprising:
   aggregating the request with other intercepted requests to perform a communication for the mobile device.

3. The method of claim 2, wherein the intercepting the request from the first application and the intercepting the other requests occur at different times.

4. The method of claim 1, further comprising:
   executing instructions for a wrapper, wherein the executed wrapper performs the intercepting of the request from the first application.

5. The method of claim 4, wherein the wrapper is located between an application layer and a socket layer of the operating system of the mobile device.

6. The method of claim 1, further comprising:
   identifying the first application as a class of application from which requests are delayed.

7. The method of claim 1, further comprising:
   determining the delay tolerance of the first application; and
   providing a callback function to the first application based on the determined delay tolerance, wherein the callback function instructs the first application to connect to the communication resources.

8. The method of claim 1, further comprising:
   determining an expiration time of a first timer associated with the first application;
   determining a tolerance and expiration time of a second timer associated with a second application;
   causing the second timer to expire based on the expiration time of the first timer, the tolerance, and the expiration time of the second timer; and
   releasing the request from the first application and an intercepted request from the second application to perform a communication for the mobile device.

9. The method of claim 1, further comprising:
   receiving a deadline from the first application;
   delaying the request until before the deadline; and
   releasing the request to connect to the communications resources prior to the deadline.

10. The method of claim 1, wherein, the request comprises a system call to establish a communications channel for the mobile device.

11. The method of claim 1, further comprising:
    releasing the request to a socket layer of the operating system upon detecting the triggering event.

12. The method of claim 1, further comprising:
    receiving an indication for an interval pertaining to how often the releasing of the request occurs.

13. The method of claim 12, wherein the interval is less than a timeout value in a stateful Internet Protocol (IP) middlebox in a network.

14. A mobile device configured for wireless communication, comprising:
    a processor;
    memory in electronic communication with the processor, the memory storing executable instructions, and the memory comprising an operating system;
    the processor configured to execute instructions to:
    identify each of a plurality of applications on the mobile device as a critical application or a non-critical application, wherein a first application from the plurality of applications is identified as a non-critical application;
    intercept a request from the a first application on the mobile device, the request being a request to establish a communication channel to perform a communication for the mobile device;
    delay, when the mobile device is in a background mode, the request from the first application based at least in part on the first application being identified as a non-critical application, wherein the delay holds the request from reaching a TCP/IP stack of an operating system executing on the mobile device, an amount of the delay based at least in part on a delay tolerance associated with the first application; and
    release the request from the first application to establish the communication channel to the operating system upon detecting a triggering event, wherein the triggering event is the mobile device entering an active mode.

15. The mobile device of claim 14, further comprising:
    aggregating the request with other intercepted requests to perform a communication for the mobile device.

16. The mobile device of claim 15, wherein the intercepting the request from the first application and the intercepting the other requests occur at different times.

17. The mobile device of claim 14, wherein the memory further comprises:
    a wrapper, wherein the processor is further configured to execute instructions on the wrapper, wherein when the instructions are executed, the wrapper is configured to intercept the request from the first application.

18. The mobile device of claim 17, wherein the wrapper is located between an application layer and a socket layer of the operating system of the mobile device.

19. The mobile device of claim 14, wherein the processor is further configured to execute instructions to:

identify the first application as a class of application from which requests are delayed.

20. The mobile device of claim 14, wherein the processor is further configured to execute instructions to:
    determine the delay tolerance of the first application; and
    provide a callback function to the first application based on the determined delay tolerance, wherein the callback function instructs the first application to connect to the communication resources.

21. The mobile device of claim 14, wherein the processor is further configured to execute instructions to:
    determine an expiration time of a first timer associated with the first application;
    determine a tolerance and expiration time of a second timer associated with a second application;
    cause the second timer to expire based on the expiration time of the first timer, the tolerance, and the expiration time of the second timer; and
    release the request from the first application and an intercepted request from the second application to perform a communication for the mobile device.

22. The mobile device of claim 14, wherein the processor is further configured to execute instructions to:
    receive a deadline from the first application;
    hold the request until before the deadline; and
    release the request to establish the communication channel prior to the deadline.

23. The mobile device of claim 14, wherein the request comprises a system call to establish a communications channel.

24. The mobile device of claim 14, wherein the processor is further configured to execute instructions to:
    release the request to a socket layer of the operating system upon detecting the triggering event.

25. The mobile device of claim 14, wherein the processor is further configured to execute instructions to:
    receive an indication for an interval pertaining to how often the releasing of the request occurs.

26. The mobile device of claim 25, wherein the interval is less than a timeout value in a stateful Internet Protocol (IP) middlebox in a network.

27. An apparatus configured to manage requests for network access from applications on a mobile device, comprising:
    means for identifying each of a plurality of applications on the mobile device as a critical application or a non-critical application, wherein a first application from the plurality of applications is identified as a non-critical application;
    means for intercepting a request from a the first application on the mobile device, the request being a request to establish a communication channel to perform a communication for the mobile device;
    means for delaying, when the mobile device is in a background mode, the request from the first application based at least in part on the first application being identified as a non-critical application, wherein the means for delaying holds the request from reaching a TCP/IP stack of an operating system executing on the mobile device, an amount of the delaying based at least in part on a delay tolerance associated with the first application; and
    means for releasing the request from the first application to establish the communication channel to the operating system upon detecting a triggering event, wherein the triggering event is the mobile device entering an active mode.

28. The apparatus of claim 27, further comprising:
    means for aggregating the request with other intercepted requests to perform a communication for the mobile device.

29. The apparatus of claim 27, wherein the intercepting the request from the first application and the intercepting the other requests occur at different times.

30. The apparatus of claim 27, further comprising:
    means for executing a wrapper, the executed wrapper configured to intercept the request from the first application.

31. The apparatus of claim 30, wherein the wrapper is located between an application layer and a socket layer of the operating system of the mobile device.

32. The apparatus of claim 27, further comprising:
    means for identifying the first application as a class of application from which requests are delayed.

33. A computer program product configured to manage requests for network access from applications on a mobile device, the product comprising a non-transitory computer-readable medium, the medium comprising:
    code to identify each of a plurality of applications on the mobile device as a critical application or a non-critical application, wherein a first application from the plurality of applications is identified as a non-critical application;
    code to intercept a request from the a first application on the mobile device, the request being a request to establish a communication channel to perform a communication for the mobile device;
    code to delay, when the mobile device is in a background mode, the request from the first application based at least in part on the first application being identified as a non-critical application, wherein the delaying holds the request from reaching a TCP/IP stack of an operating system executing on the mobile device, an amount of the delay based at least in part on a delay tolerance associated with the first application; and
    code to release the request from the first application to establish the communication channel to the operating system upon detecting a triggering event, wherein the triggering event is the mobile device entering an active mode.

* * * * *